(12) United States Patent
Mukhopadhyaya et al.

(10) Patent No.: US 10,892,937 B1
(45) Date of Patent: *Jan. 12, 2021

(54) INTER-METRO SERVICE CHAINING

(71) Applicant: Equinix, Inc., Redwood City, CA (US)

(72) Inventors: Utpal Mukhopadhyaya, San Jose, CA (US); Kaladhar Voruganti, San Jose, CA (US); Sindhu Payankulath, Saratoga, CA (US)

(73) Assignee: EQUINIX, INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/731,942

(22) Filed: Dec. 31, 2019

Related U.S. Application Data

(63) Continuation of application No. 15/720,956, filed on Sep. 29, 2017, now Pat. No. 10,530,632.

(51) Int. Cl.
*H04L 12/24* (2006.01)
*H04L 29/08* (2006.01)
(Continued)

(52) U.S. Cl.
CPC .......... *H04L 41/022* (2013.01); *G06F 16/284* (2019.01); *H04L 29/08135* (2013.01);
(Continued)

(58) Field of Classification Search
CPC ............... H04L 29/08135; H04L 41/08; H04L 41/0823; H04L 41/0893;
(Continued)

(56) References Cited

U.S. PATENT DOCUMENTS 7,684,321 B2  3/2010  Muirhead et al.
8,423,672 B2  4/2013  Liu et al.
(Continued)

FOREIGN PATENT DOCUMENTS

WO    2018020446 A1    2/2018

OTHER PUBLICATIONS

Dredge, "The Missing Link: Service Function Chaining and Its Relationship to NFV," metaswitch.com, Nov. 25, 2015, 17 pages.
(Continued)

*Primary Examiner* — Brendan Y Higa
(74) *Attorney, Agent, or Firm* — Shumaker & Sieffert, P.A.

(57) ABSTRACT

Techniques described in this disclosure are directed to a co-location facility provider generating an inter-metropolitan area service chain for application of a plurality of services offered by cloud service providers located in geographically distributed metropolitan areas. In some examples, a method includes receiving, by a controller executing at a computing device of a co-location facilities provider, a request for a plurality of services to be applied to data of a customer; in response to receiving the request, generating, by the controller, a service chain for application of each of the plurality of services provided by a different one of a plurality of cloud service providers, wherein the services are applied by each of the plurality of cloud service providers at co-location facilities in geographically distributed metropolitan areas; and providing, by the controller and to the customer, the service chain for application of the plurality of services.

21 Claims, 8 Drawing Sheets

(51) Int. Cl.
*H04L 12/26* (2006.01)
*G06F 16/28* (2019.01)
*H04L 12/857* (2013.01)

(52) U.S. Cl.
CPC ...... *H04L 41/5041* (2013.01); *H04L 41/5045* (2013.01); *H04L 41/5054* (2013.01); *H04L 43/08* (2013.01); *H04L 47/2491* (2013.01); *H04L 67/025* (2013.01); *H04L 67/10* (2013.01); *H04L 67/1042* (2013.01); *H04L 67/30* (2013.01)

(58) Field of Classification Search
CPC ....... H04L 41/5041–5054; H04L 45/44; H04L 45/64; H04L 47/20; H04L 47/24–2441; H04L 67/10; H04L 67/1074–1087
See application file for complete search history.

(56) References Cited

U.S. PATENT DOCUMENTS

| | | |
|---|---|---|
| 8,495,199 B2 | 7/2013 | Miller et al. |
| 9,258,237 B1 | 2/2016 | Smith et al. |
| 9,338,218 B1 | 5/2016 | Florissi et al. |
| 9,485,323 B1 | 11/2016 | Stickle et al. |
| 9,712,435 B2 | 7/2017 | Teng et al. |
| 9,838,246 B1 | 12/2017 | Hegde et al. |
| 9,948,552 B2 | 4/2018 | Teng et al. |
| 9,983,860 B1 | 5/2018 | Koty et al. |
| 10,015,268 B2 | 7/2018 | Rao |
| 10,158,727 B1 | 12/2018 | Mukhopadhyaya et al. |
| 10,530,632 B1 | 1/2020 | Mukhopadhyaya et al. |
| 10,567,519 B1 | 2/2020 | Mukhopadhyaya et al. |
| 2002/0004390 A1 | 1/2002 | Cutaia et al. |
| 2003/0105810 A1 | 6/2003 | McCrory et al. |
| 2011/0016214 A1* | 1/2011 | Jackson ................. G06F 9/505 709/226 |
| 2011/0289329 A1 | 11/2011 | Bose et al. |
| 2012/0303736 A1 | 11/2012 | Novotny et al. |
| 2013/0041728 A1 | 2/2013 | Morrow et al. |
| 2014/0278723 A1* | 9/2014 | Liu ................... G06Q 10/0633 705/7.27 |
| 2015/0067171 A1 | 3/2015 | Yum et al. |
| 2015/0156065 A1 | 6/2015 | Grandhe et al. |
| 2016/0094483 A1* | 3/2016 | Johnston ................. G06F 8/65 709/226 |
| 2016/0127254 A1 | 5/2016 | Kumar et al. |
| 2016/0127454 A1 | 5/2016 | Maheshwari et al. |
| 2016/0301598 A1 | 10/2016 | Strijkers et al. |
| 2016/0308762 A1 | 10/2016 | Teng et al. |
| 2016/0330288 A1 | 11/2016 | Hoffman et al. |
| 2016/0337473 A1 | 11/2016 | Rao |
| 2016/0344798 A1 | 11/2016 | Kapila |
| 2017/0041384 A1* | 2/2017 | Son ..................... H04L 41/5006 |
| 2017/0201585 A1 | 7/2017 | Doraiswamy et al. |
| 2017/0339070 A1 | 11/2017 | Chang et al. |
| 2017/0346704 A1* | 11/2017 | Strijkers ............. G06F 9/45558 |
| 2018/0060106 A1 | 3/2018 | Madtha et al. |
| 2018/0139149 A1* | 5/2018 | Chen ..................... G06F 9/5072 |
| 2018/0145923 A1* | 5/2018 | Chen ..................... G06F 9/5077 |
| 2018/0367632 A1 | 12/2018 | Oh et al. |
| 2019/0014102 A1 | 1/2019 | Mathew et al. |

OTHER PUBLICATIONS

Filsfils et al., "Segment Routing Architecture," Network Working Group, draft-filsfills-rtgwg-segment-routing-00, Jun. 28, 2013, 28 pp.

Filsfils et al., "Segment Routing Architecture," Network Working Group, draft-filsfils-spring-segment-routing-04, Jul. 3, 2014, 18 pp.

Filsfils et al., "Segment Routing Use Cases," Network Working Group, draft-tilsfills-rtgwg-segment-routing-use-cases-01, Jul. 14, 2013, 46 pp.

Filsfils et al., "Segment Routing with MPLS Data Plane," Network Working Group, draft-ffisfils-spring-segment-routing-mpls-03, Jul. 31, 2014, 14 pp.

Previdi et al., "Source Packet Routing in Networking (SPRING) Problem Statement and Requirements," RFC 7855, Internet Engineering Task Force (IETF), May 2016, 19 pp.

U.S. Appl. No. 15/475,957, filed Mar. 31, 2017, by Wagner et al.

Prosecution History from U.S. Appl. No. 15/720,956, dated Oct. 2, 2019 through Nov. 22, 2019, 18 pp.

Prosecution History from U.S. Appl. No. 15/099,428, dated Mar. 27, 2018 through Nov. 15, 2018, 36 pp.

Prosecution History from U.S. Appl. No. 16/222,554, dated Mar. 15, 2019 through Nov. 25, 2019, 32 pp.

* cited by examiner

INTER-METRO SERVICE CHAINING

This application is a continuation of U.S. application Ser. No. 15/720,956, entitled "INTER-METRO SERVICE CHAINING," filed Sep. 29, 2017, the entire contents of which is incorporated by reference herein.

TECHNICAL FIELD

The disclosure relates to computer networks and, more specifically, a co-location facility for interconnecting services of the co-location facility provider.

BACKGROUND

A co-location facility provider (a "provider") may employ a communication facility, such as a data center or warehouse, in which multiple customers of the provider locate network, server, and storage gear and interconnect to a variety of telecommunications, cloud, and other network service provider(s) with a minimum of cost and complexity. By using co-location facilities of the provider, customers of the provider including telecommunications providers, Internet Service Providers (ISPs), application service providers, service providers, content providers, and other providers, as well as enterprises, enjoy high flexibility, less interconnection latency, and therefore can focus on their core business.

Cloud computing refers to the use of dynamically scalable computing resources, storage resources etc., accessible via a network, such as the Internet. Computing resources, often referred to as a "cloud," provide one or more services to customers. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS) and Infrastructure-as-a-Service (IaaS), respectively.

The term "cloud-based services" or, more simply, "services" refers not only to services provided by a cloud, but also to a form of service provisioning in which customers contract with service providers for the online delivery of services provided by the cloud. Service providers manage a public, private, or hybrid cloud to facilitate the online delivery of services to one or more customers. In some instances, multiple customers and service providers may have physical and/or logical network interconnections at co-location facility points that provide for high-speed transmission of information between the customers and service providers. The co-location facility may in such instances be alternatively referred to as an "interconnection facility."

SUMMARY

In general, techniques described in this disclosure are directed to network controller operated by a co-location facility provider generating an inter-metropolitan area service chain for application of a plurality of services offered by cloud service providers located in different co-location facilities of the co-location facility provider in geographically distributed metropolitan areas. The co-location facilities may each provide one or more services, such as cloud-based services. The co-location facility provider may provide inter-metro connectivity between the co-location facilities located across the geographically distributed metropolitan areas such that a customer may access a plurality of services of different metropolitan areas.

As the operator of co-location facilities in which multiple cloud service providers co-locate to offer cloud services, the network controller of the co-location facility provider may gather data associated with services provided by the co-location facilities, and based on the data and a customer request for services, may generate an inter-metropolitan area service chain to access one or more services provided by a remote co-location facility. In this way, the co-location facility provider leverages its central position within the interconnected metropolitan areas to facilitate an inter-metro connection to provide a customer access to multiple services offered by multiple cloud service providers of geographically distributed metropolitan areas.

In one example, a method includes receiving, by a controller executing at a computing device of a co-location facilities provider, a request for a plurality of services to be applied to data of a customer of the co-location facilities provider. The method also includes, in response to receiving the request, generating, by the controller, a service chain for application of each of the plurality of services provided by a different one of a plurality of cloud service providers, wherein the services are applied by each of the plurality of cloud service providers at co-location facilities of the co-location facilities provider in a plurality of geographically distributed metropolitan areas. The method also includes providing, by the controller and to the customer, the service chain for application of the plurality of services.

In another example, a computing device includes at least one computer processor; and a memory comprising instructions that when executed by the at least one computer processor cause the at least one computer processor to: receive a request for a plurality of services to be applied to data of a customer of the co-location facilities provider; in response to receiving the request, generate a service chain for application of each of the plurality of services provided by a different one of a plurality of cloud service providers, wherein the services are applied by each of the plurality of cloud service providers at co-location facilities of the co-location facilities provider in a plurality of geographically distributed metropolitan areas; and provide the service chain to the customer for application of the plurality of services.

In another example, a non-transitory computer-readable storage medium encoded with instructions that, when executed, cause at least one processor of a computing device of a co-location facility provider to: receive a request for a plurality of services to be applied to data of a customer o the co-location facilities provider; in response to a receipt of the request, generate a service chain for application of each of the plurality of services provided by a different one of a plurality of cloud service providers; and provide the service chain to the customer for application of the plurality of services.

The details of one or more examples are set forth in the accompanying drawings and the description below. Other features, objects, and advantages of the disclosure will be apparent from the description and drawings, and from the claims.

BRIEF DESCRIPTION OF DRAWINGS

Like reference characters denote like elements throughout the figures and text.

DETAILED DESCRIPTION

Figure 1:
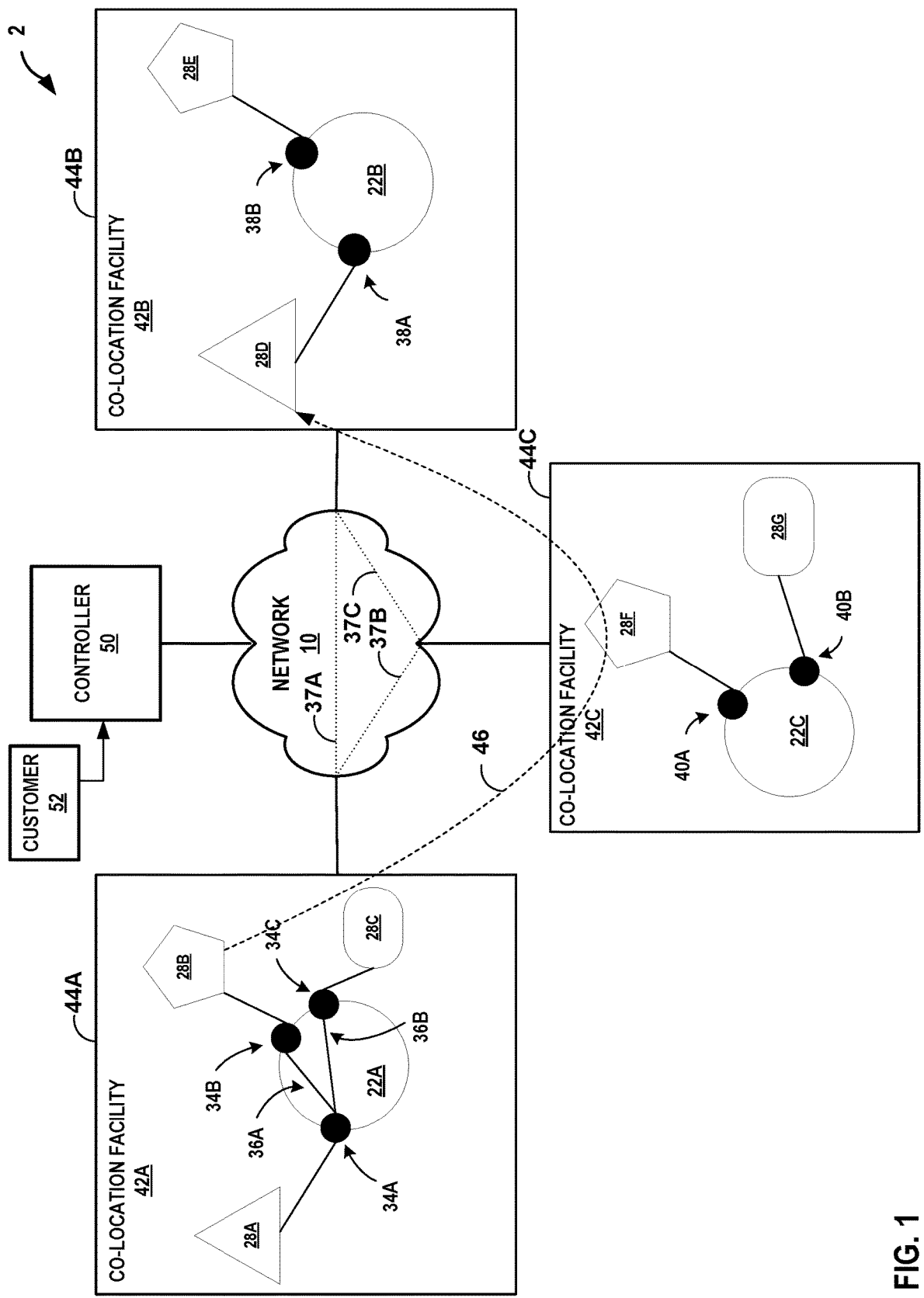
FIG. 1 is a block diagram illustrating a system for generating an inter-metropolitan area service chain for application of a plurality of services offered by cloud service providers located in geographically distributed metropolitan areas, in accordance with one or more techniques of the disclosure.

A co-location facility provider ("provider") employs network infrastructure within a co-location facility that enables customers to connect, using interconnections established within the network infrastructure by the provider, to one another to receive and transmit data for varied purposes. For instance, a co-location facility may provide data transport services to one or more cloud-based services. The co-location facility in this way offers customers connectivity to a vibrant ecosystem of additional customers including content providers, Internet service providers, carriers, and enterprises. Customers of the co-location facility may connect for such end-uses as service delivery, content delivery, financial services, and Internet access, to give just a few examples.

A co-location facility may offer products such as cage, cabinet, and power to its customers. A co-location facility may also offer products relating to interconnection such as cross-connect and virtual circuit. As used herein, the term "customer" of the co-location facility provider or "co-location facility customer" may refer to a tenant of at least one co-location facility deployed by the co-location facility provider, whereby the customer leases space within the co-location facility in order to co-locate with other tenants for improved efficiencies over independent facilities as well as to interconnect network equipment with the other tenants'/customers' network equipment within the co-location facility or campus for reduced latency/jitter and improved reliability, performance, and security versus transport networks, among other reasons. A co-location facility typically hosts numerous customers and their network, server, and/or storage gear. Each customer may have particular reasons for choosing a co-location facility, including capacity, geographical proximity, connecting to other customers, co-locating with other customers, and price.

A co-location facility may provide one or more different types of interconnections between customer networks for customers co-located in the co-location facility. For instance, a co-location facility may provide physical or "layer-1" (in the Open Systems Interconnection model (OSI Model)) interconnections between co-location facility customers. Physical interconnections may include physical cross-connects that are established by category 5 or 6 (cat 5/6) cables, coaxial cables, and/or fiber optic cables, for instance. In some examples, a co-location facility may provide data link or "layer-2" (in the OSI Model) interconnections between co-location facility customers. In some examples, a co-location facility that provides layer-2 interconnections may be referred to as an Ethernet Exchange, where Ethernet is the underlying layer-2 protocol. In some examples, a co-location facility may provide network and/or transport or "layer-3/4" (in the OSI Model) interconnections between co-location facility customers. In some examples, a co-location facility that providers layer-3/4 interconnections may be referred to an Internet Exchange, where TCP/IP are the underlying layer-3/4 protocols. For example, a co-location facility that provides an Internet Exchange may allow customer routers to directly peer with one another using a layer-3 routing protocol, such as Border Gateway Protocol, to exchange routes for facilitating layer-3 traffic exchange to provide private peering. In some examples, a co-location facility may provide indirect layer-3 routing protocol peering whereby each customer announces its layer-3 routes to an autonomous system (AS) deployed by the co-location facility provider within the co-location facility network infrastructure to provide private peering mediated by the AS. The AS may then relay these routes in conjunction with tunneling or other forwarding mechanisms to establish an interconnection between customers. In some examples, a co-location facility that provides indirect layer-3 routing protocol peering to facilitate service traffic exchange is referred to as a Cloud-based Services Exchange or, more simply, a Cloud Exchange. Additional description of a cloud exchange is found in U.S. patent application Ser. No. 15/099,407, filed Apr. 14, 2016, entitled "CLOUD-BASED SERVICES EXCHANGE," and U.S. Ser. No. 15/001,766, filed Jan. 20, 2016, entitled "MULTI-CLOUD, MULTI-SERVICE DATA MODEL," the entire content of each of which being incorporated by reference herein.

In some examples, a "connection" may be a physical or logical coupling between a co-location facility customer in a customer or provider network and a co-location facility point. An "interconnection" may be a physical or logical coupling between connections that couple at least two co-location facility customers. As such, a network infrastructure configuration within a co-location facility that enables customer networks to connect to exchange data may be referred to herein as an "interconnection." A cross-connect interconnection may refer to a physical coupling between two co-location facility customer networks. An Ethernet interconnection may be a layer 2 coupling between two co-location facility customer networks via ports of the co-location facility. An Internet or cloud exchange interconnection may be a layer-3/4 coupling between two co-location facility customer networks via ports of the co-location facility. The foregoing examples of co-location facilities and interconnections are exemplary only and many other types of co-location facilities and interconnections are possible.

FIG. 1 is a block diagram illustrating a system 2 for generating an inter-metropolitan area ("inter-metro") service chain for application of a plurality of services offered by cloud service providers located in two or more geographically distributed metropolitan areas, in accordance with one or more techniques described in the disclosure. FIG. 1 illustrates co-location facilities 42A, 42B, and 42C (collectively, "co-location facilities 42") that are each located in a corresponding metropolitan area ("metro") 44A, 44B, and 44C (collectively, "metros 44"). For example, co-location facility 42A may be located in metro 44A (e.g., San Francisco), co-location facility 42B may be located in a different metro 44B (e.g., Dallas), and co-location facility 42C may be located in a different metro 44C (e.g., New York). As shown in FIG. 1, co-location facility 42A includes a co-location facility network 22A, co-location facility 42B includes a co-location facility network 22B, and co-location facility 42C includes a co-location facility network 22C (collectively, co-location facility networks 22").

In the example of FIG. 1, co-location facility network 22A includes connections 34A-34C by co-location facility customers 28A-28C ("customers 28"). For instance, co-location facility customer 28A may represent a system or network of the customer that is coupled to co-location facility network 22A by connection 34A. Similarly, co-location facility customer 28B may be a system or network of the customer that is coupled to co-location facility network 22A by connection 34B. Co-location facility customer 28C may be a system or network of the customer that is coupled to co-location facility network 22A by connection 34C. Customers 28 may be enterprise customers of the co-location facility provider, cloud service provider customers of the co-location facility provider, or other types of customers. In some examples, a first one of customers 28 may be a customer of a second one of customers 28, in that first one of the customers receives services from the other.

FIG. 1 further illustrates two interconnections 36A and 36B. Interconnection 36A may be a physical or logical coupling between connections 34A and 34B that couple co-location facility customer 28A to co-location facility customer 28B. Interconnection 36B may be a physical or logical coupling between connections 34A and 34C that couple co-location facility customer 28A to co-location facility customer 28C. As described above, a cross-connect interconnection may refer to a physical coupling (e.g., fiber or Cat5/6 cable between two network devices and/or systems of co-location facility customers). An Ethernet interconnection may be a layer-2 coupling between two co-location facility customers, such as one or more Virtual Local Area Networks (VLANs) or other logical networks providing L2 reachability. An Internet exchange interconnection may be a layer-3/4 coupling between two co-location facility customers, such as a layer-3 network path provided by an Internet Exchange. In some examples, an interconnection may be a virtual circuit established at least in part within a co-location facility. The interconnections described herein may include at least one of a physical cross-connect, a virtual Ethernet connection providing a layer 2 forwarding path, a direct layer 3 peering arrangement to establish an end-to-end layer 3 forwarding path (e.g., using a layer 3 VPN), and an indirect layer 3 peering arrangement to establish an end-to-end layer 3 forwarding path (e.g., using a layer 3 VPN). Customers may establish multiple interconnections over a single physical port. For example, a customer may exchange data via a L2 interconnection with a first cloud service provider and via a L3 interconnection with a second cloud service provider, both the L2 and L3 interconnections operating over a single customer port for the customer. In some examples, an enterprise customer may have multiple interconnections, operating over a single port, with multiple different cloud service providers to receive cloud-based services.

In some examples, co-location facilities may simply provide network infrastructure to host multiple Cloud Service Providers (CSPs) and are primarily focused on ensuring network connectivity between the customers (Enterprises, Network Service Providers/Aggregators) and the CSPs. These co-location facilities may operate with a simple service level agreement (SLA) having requirements for network uptime, data throughput, data latency, delay, jitter etc. and try to ensure best possible user-level experience perceived by the customers subscribed to the CSPs offering a variety of cloud-based services like SaaS, PaaS, IaaS etc. The SLAs offered may vary depending on the parties involved, such as (1) SLAs between the end customers and the co-location facilities (2) SLA's between the co-location facility and the CSPs or (3) even SLA's between the end customers and the CSPs. There may or may not be complex dependency among different types of SLAs, but to enforce and track these SLAs, co-location facilities may measure and monitor various metrics in their network infrastructure on a periodic basis.

In some examples, a customer of one co-location facility may desire services that are not offered by a CSP in the co-location facility. In one instance, customer 52 may represent any co-location facility customers 28 of FIG. 1. Customer 52 may request a plurality of services, e.g., firewall services and storage services. As further described below, the plurality of services may be offered by a plurality of cloud service providers of geographically distributed metros. For example, the best available firewall services may be offered by a cloud service provider located in metro 44A and the best available storage services (e.g., most cost effective storage service) may be offered by a cloud service provider located in metro 44C. A customer may desire services from one or more CSPs of remote metropolitan areas to access the best available services. Typically, to access these remote services, the customer is required to request for multiple connections, e.g., virtual connections, with the CSPs (i.e., one virtual circuit for each provider).

In accordance with the techniques of this disclosure, a provider of co-location facilities 42 may generate an inter-metro service chain for application of services offered by cloud service providers of geographically distributed metropolitan areas. For example, the co-location facilities provider may provide inter-metro connections 37A, 37B, and 37C (collectively, "inter-metro connections 37") between metros 44 for which customers of the co-location facilities 42 may access services offered by CSPs located in a different metro. Inter-metro connections 37 may be a physical or logical coupling between connections that couple at least two co-location facility customers of different metros. As one example, to interconnect geographically distributed metros, e.g., metros 44, the provider of co-location facilities 42 may use long-haul optical interconnections 37A, 37B, and 37C (collectively, "inter-metro connections 37") using Layer 1, Layer 2, or Layer 3 services of optical fiber carrier vendors. In the example of FIG. 1 co-location facility 42A of metro 44A may interconnect with co-location facility 42B of metro 44B via inter-metro connection 37A, co-location facility 42A of metro 44A may interconnect with co-location facility 42C of metro 44C via inter-metro connection 37B, and co-location facility 42B of metro 44B may interconnect with co-location facility 42C of metro 44C via inter-metro connection 37C.

As further described below, co-location facilities 42 may each provide inter-metro connectivity services to customers, with secure, private, virtual connections to co-location facilities located in different metros via inter-metro connections 37. As one example, the co-location facility provider may facilitate a machine-to-machine communication, e.g., via virtual connections with partner network service providers (not shown), to enable cloud-based services delivery from co-location facilities distributed across different metropolitan areas. Further example details of inter-metro connectivity can be found in U.S. patent application Ser. No. 15/475,957, filed Mar. 31, 2017 and entitled "INTER-METRO CONNECTIVITY NETWORK CONNECT," the contents of which are incorporated herein by reference in its entirety.

FIG. 1 depicts a centralized service controller 50 connected to network 10 to receive service requests from a customer 52 and to generate service chains of services offered by various cloud service providers (local or remote) in any order. As described above, network 10 may include Layer 1, Layer 2, or Layer 3 services of optical fiber carrier vendors. A customer 52 may send a request, e.g., via a template form, to controller 50 for a plurality of services. In some examples, customer 52 may also provide controller 50 with the desired order of services. For example, customer 52 may request firewall services, storage services, and Network Address Translation (NAT) services, in that order. The CSPs that optimally provide these services may be located in geographically distributed metropolitan areas 44. For example, CSPs 28B and 28C of metro 44A may provide firewall and storage services, respectively. CSPs 28D and 28E of metro 44B may provide NAT services and firewall services, respectively. CSPs 28F and 28G of metro 44C may provide storage services and NAT services, respectively. In one instance, firewall services provided by CSP 28B may be the only firewall services available, whereas the storage services provided by CSP 28F may be more cost effective. That is, to best satisfy the customer request for firewall services and storage services, the customer may need to access services provided by CSP 28B of metro 44A and CSP 28F of metro 44C, respectively.

In response to receiving the customer service request, controller 50 may determine which of the CSPs may best satisfy the customer service request. For example, controller 50 may access data describing performance of services provided by cloud service providers of co-location facilities 42. This data may include data describing co-location facility customers 28, interconnections 36, connections 34, inter-metro connections 37, or co-location facility networks 22. Controller 50 may generate a data store based on telemetry data, service provider data, and service data, for example. In some examples, service data may include information about the actual measured performance of services or applications in co-location facilities 42. Controller 50 may also query historical service performance data describing past performance of services within co-location facilities 42 and generate a data model based in part on the historical data. Controller 50 is configured based on the metrics selected by the co-location facilities provider for characterizing each service, and then controller 50 collects and analyzes data for each of the metrics to generate a service data model.

Controller 50 may build an intelligent knowledge base by gaining better visibility and understanding of the various applications or services offered by the various providers. This may involve the co-location facilities provider taking steps to understand and/or ensure more granular metrics needed for those applications to succeed. To give an example, if some CSPs are offering storage services as one of their offerings, co-location facilities providers would pro-actively build a knowledge base on what it takes to make customers have good storage services experience by ensuring their networks meet quality metrics requirement demanded of storage service offering like read latency, write latency, scale demands of large number of concurrent customers from an enterprise accessing those storage services offered by CSPs, etc.

This process is referred to herein as service/application characterization, where services/applications are defined as a function of tangible quantifiable attributes and metrics. Customers subscribed to those service offerings from various providers (CSPs) will have good application experience if those metrics are satisfied by the network ecosystem provided by the co-location facilities. For instance, as described in further detail below, the service characterizations may be based on one or more attributes such as spatial characterization of services, temporal characterization of services, an aggregate view characterization of services, characterization based on service provisioning time, characterization based on service support resolution capabilities, and other characterizations of services.

In some examples, controller 50 may determine, based on the service/application characterization, that a network ecosystem of a co-location facility from a remote metropolitan area may provide a better application experience. In some examples, controller 50 may rank the cloud service providers and co-location facilities based on a score, such as in descending order of highest score to lowest score, and may evaluate the services based on the ranking. In this way, controller 50 may determine which cloud service providers at which co-location facilities, and at which metropolitan area would provide the services in a manner best suited to the customer's requests.

Continuing the example above, CSP 28C of metro 44A and CSP 28F of metro 44C may offer the same sets of services, such as network storage services. By virtue of the service characterization model described herein, controller 50 may compare among the network storage services provided by CSPs 28C and 28F. Controller 50 can compare the service offerings based on cost or pricing structures published by CSPs and include this information in the service data model. In the above example, controller 50 may determine, based on the service/application characterization, that CSP 28F may offer cheaper storage services than the storage services offered by CSP 28C.

To provide access to remote services, controller 50 may generate an inter-metro service chain 46 to apply a plurality of services provided by different CSPs of different metros. Continuing the example above, customer 52 may request firewall services, storage services, and NAT services, in that order. Controller 50 may determine, based on the service characterization, that CSP 28B of metro 44A provides the best firewall services, CSP 28F of metro 44C provides storage services for a lowest cost, and CSP 28D of metro 44B provides the only available NAT services. Controller 50 may utilize inter-metro connections 37B and 37C to provide customer 52 inter-metro connectivity to access these services and may generate an inter-metro service chain 46.

To implement the inter-metro service chain 46 in the network, controller 50 may, for example, use a segment routing protocol, e.g., Source Packet Routing in Networking ("SPRING"). Controller 50 may use the segment routing protocol to stack globally unique MPLS labels for each service node and/or interconnection links, and may provide the label stack to an ingress service node or other device in the network. A "segment" may be an identifier for any type of instruction related to forwarding or service. Segment routing may be a type of source routing where the source or ingress node chooses a path (or a controller helps it with a chosen path) and encodes it in the packet header as an ordered list of segments. For example, in the case of an MPLS forwarding plane, ordered list of segments may be represented as a stack of MPLS labels. Although FIG. 1 is described in accordance with a segment routing protocol, the techniques described in this disclosure may alternatively or additionally use IPv6 next header information or Network Service Header (NSH) information.

The segment routing protocol includes different label types including "node" labels and "adjacency" labels. Segment routing is further described in Filsfils et. al., "Segment Routing Architecture," Internet-Draft draft-filsfils-rtgwg-segment-routing-00, June 2013, while Segment Routing use cases are described in Filsfils et. al., "Segment Routing Use Cases," Internet-Draft draft-filsfils-rtgwg-segment-routing-use-cases-01, July 2013, the entire contents of each of which are incorporated herein by reference. Further details regarding segment routing are found in (1) "Segment Routing Architecture," IETF draft: draft-filsfils-spring-segment-routing-04, Jul. 3, 2014; (2) S. Previdi, et al., "Source Packet Routing in Networking (SPRING) Problem Statement and Requirements," RFC 7855, May 201; and (3) "Segment Routing with MPLS data plane," IETF draft: draft-filsfils-spring-segment-routing-mpls-03, Aug. 1, 2014, the entire contents of each of which are incorporated by reference herein.

Controller 50 may store and allocate globally unique node (e.g., prefix-sid) or locally significant adjacency labels (e.g., adj-sid) to identify each cloud-exchange node in co-location facilities 42, each CSP node in the co-location facilities 42, each connection between the CSP and the co-location facility, and each interconnection coupling the co-location facilities of different metros. In the example of FIG. 1, a cloud-exchange node in co-location facility 42A may be allocated a unique label (e.g., 1), a cloud-exchange node in co-location facility 42B may be allocated another unique label (e.g., 2), and a cloud-exchange node in co-location facility 42C may be allocated another unique label (e.g., 3). These node labels may uniquely identify the cloud-exchange node for which one or more services may be accessed.

A node for CSP 28B, which may provide firewall services, may have a unique label (e.g., 11), a node for CSP 28D, which may provide NAT services, may have another unique label (e.g., 23), a node for CSP 28F, which may provide storage services, may have another unique label (e.g., 32), and so forth. These node labels may uniquely indicate the CSP node in a particular co-location facility for which a particular service may be offered. These unique label allocations help differentiate the same services being offered from the same CSPs in different co-location facilities or same services being offered from different CSPs in same or different co-location facilities.

Each connection within each of co-location facilities 42 may be allocated an adjacency label. For example, connection 34B that connects a node for CSP 28B to co-location facility 42A may be allocated a unique label (e.g., 111), connection 38A that connects a node for CSP 28D to co-location facility 42B may be allocated another unique label (e.g., 213), and connection 40A that connects a node for CSP 28F to co-location facility 42C may be allocated another unique label (e.g., 312). These adjacency labels may be used to steer traffic onto an adjacency or set of adjacencies that identify connections to the CSPs that offer a particular service.

Each inter-metro connection 37 may be allocated a unique label. For example, inter-metro connection 37A may be allocated a unique adjacency label (e.g., 11111), inter-metro connection 37B may be allocated another unique label (e.g., 11211), and inter-metro connection 37C may be allocation another unique label (e.g., 11222). These adjacency labels may be used to steer traffic onto an adjacency or set of adjacencies indicating a co-location facility of a remote metropolitan area.

These unique labels may be generated, stored, populated, and propagated to controller 50 using, e.g., an IGP protocol (e.g., OSPF, IS-IS) or BGP protocols (BGP-LS) running within co-location facility infrastructure. Controller 50 may have full visibility of all the customer nodes in all metro locations, all the CSP nodes (with which plurality of services are associated) geographically distributed across all facilities, all the cloud exchange nodes, all the links connecting the customers as well as CSPs to the Cloud Exchange nodes, and/or all the NSP links interconnecting two or more co-location facilities. Each of these nodes/links may generate globally unique labels (e.g., MPLS labels). The service chain relies on modifying the path of traffic flow through the correct set of service nodes and in the right order, i.e., the way the customer defined the service intent.

Controller 50 may map service requests of customers into a stack of labels, e.g., MPLS labels, uniquely identifying plurality of service nodes that are traversed along the way by customer traffic and advise the customer traffic source node to append the stack of labels as additional header info. Each data packet from customer may carry the stack of labels that help steer the traffic from nodes to nodes and by links to links until the end destination of the packet is reached. At each service node along the path toward the destination node, the labels are popped. In some examples, when a packet transits a node for which labels have not been programmed in its label stack, the stack remains intact and the packet is forwarded to the next-hop.

A customer may define service intent (i.e., sequence of services) through a UI provided by the co-location facility provider. Customers may input via the UI, constraints or performance criteria for each of these services like. g., lowest latency, minimal cost, high availability etc. In response to the controller 50 mapping the customer service requests into one or more service chains of service nodes to be visited in sequence based on the complex constraints or performance criteria inputted by the customers, the controller may generate a stack of labels for the entire chain and advise the customer nodes to append the stack in a header of each data packet. The stack of labels may contain CSPs of geographically distributed metropolitan areas to provide the customer with an inter-metro service chain.

Figure 2:
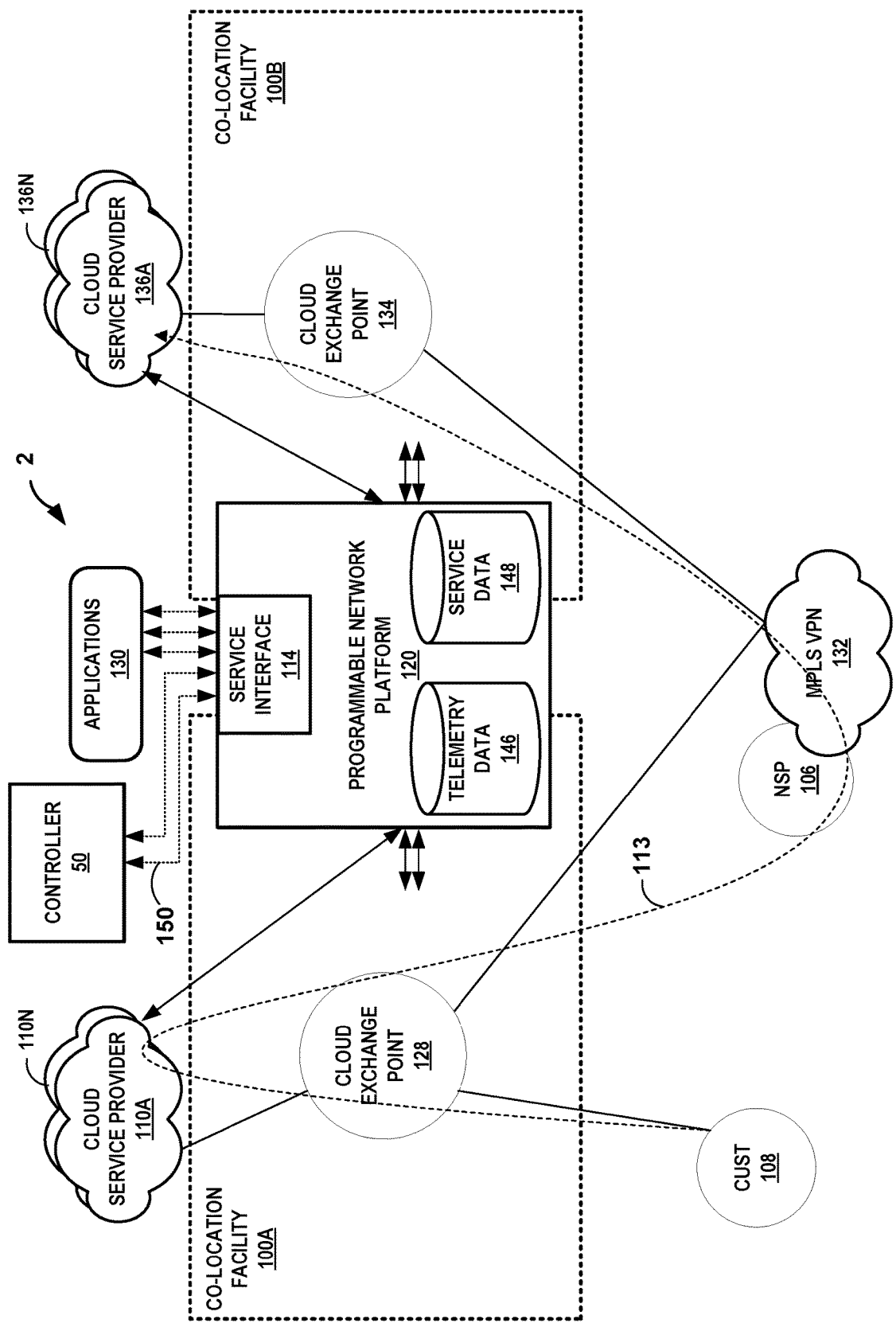
FIG. 2 illustrates a conceptual view of a network system having an inter-connecting metro-based cloud exchange that provides multiple cloud exchange points across different metropolitan areas, in accordance with one or more techniques described herein.

FIG. 2 illustrates a conceptual view of a system 2 having inter-connecting metro-based co-location facilities that provide one or more cloud exchange points across different metropolitan areas according to techniques described herein. Co-location facilities 100A, 100B (collectively, "co-location facilities 100"), respectively, may represent different data centers geographically located within different metropolitan areas ("metro-based," e.g., in New York City, N.Y.; Silicon Valley, Calif.; Seattle-Tacoma, Wash.; Minneapolis-St. Paul, Minn.; London, UK; etc.). Cloud-based services exchange points 128, 134 provide resilient and independent cloud-based services exchanges by which cloud-based services customers ("cloud customers") of one metro and cloud service providers of a different metro connect to receive and provide, respectively, cloud services. Co-location facilities 100 of FIG. 2 may represent any of co-location facilities 42 of FIG. 1. In various examples, co-location facilities 100A, 100B may include more or fewer cloud exchange points 128 and 134, respectively. As used herein, reference to a "cloud exchange," "cloud-based services exchange," or "co-location facility" may refer to a cloud exchange point. A co-location facilities provider may deploy instances of co-location facilities 100 in multiple different metropolitan areas, each instance of co-location facilities 100A, 100B having one or more cloud exchange points 128, 134, respectively.

Each of cloud exchange points 128, 134 includes network infrastructure and an operating environment by which cloud customer 108 receives cloud services from cloud service providers 110A-110N (collectively, "CSPs 110") and 136A-136N (collectively, "CSPs 136"), respectively. For example, cloud customer 108 may also receive cloud-based services directly via a layer 3 peering and physical connection to one of cloud exchange points 128 or indirectly via network service provider 106 (or alternatively, "carrier 106"). NSP 106 may also provide "cloud transit" to the cloud services of corresponding metros by maintaining a physical presence within one or more of cloud exchange points and aggregating layer 3 access from one or more customers. In some examples, an NSP may provide a cloud transit to cloud services of a different metro by maintaining a physical presence within one or more cloud exchange points of a cloud exchange of the different metro. For example, NSP 106 may peer, at layer 3, e.g., multiprotocol label switching virtual private network (MPLS VPN) 132, directly with one or more cloud exchange points 128, 136, and in so doing offer indirect layer 3 connectivity and peering to customer 108 by which customer 108 may obtain one or more cloud services from a co-location facility of one metro and one or more cloud services from a co-location of a different metro.

Cloud service providers 110, 136 provide one or more services, such as compute services, content delivery network services, firewall services, network address translation (NAT) services, applications/software services, platforms services, infrastructure services, virtualization services, server services and data storage services, for example. In some examples, different cloud services providers 110 provide different subsets of the above services, with some of the same services being provided by multiple different cloud service providers 136.

Each of cloud exchange points 128, 134, in the example of FIG. 1, is assigned a different autonomous system number (ASN). For example, cloud exchange point 128 of co-location facility 100A is assigned ASN 1, and cloud exchange point 134 of co-location facility 100B is assigned ASN 2. Cloud exchange point 128 is thus a next hop in a path vector routing protocol (e.g., BGP) path from customer 108 to cloud service providers 110.

Moreover, by utilizing "partner" NSPs, e.g., NSP 106, coupled to different metros, cloud exchange point 128 may be a next hop across the different metropolitan areas in a path vector routing protocol path from cloud service providers 110 of one metro to cloud service providers 136 of a different metro. As a result, cloud exchange point 128 may, despite not being a transit network having one or more wide area network links and concomitant Internet access and transit policies, peer with multiple different autonomous systems via external BGP (eBGP) or other exterior gateway routing protocol, including network service providers with access to customers of a different metro, in order to exchange, aggregate, and route service traffic from one or more cloud service providers 110 of one metro to cloud service provider 136 of a different metro. In other words, cloud exchange point 128 may internalize the eBGP peering relationships and NSP relationships that cloud service providers 136 and customer 108 would maintain on a pair-wise basis.

In this way, a customer 108 may configure a single eBGP peering relationship and NSP relationship with a cloud exchange point 134 and receive, via co-location facility 100B of a different metro, multiple cloud services from one or more cloud service providers 136. While described herein primarily with respect to eBGP or other layer 3 routing protocol peering between cloud exchange points and customer, NSP, or cloud service provider networks, the cloud exchange points may learn routes from these networks in other ways, such as by static configuration, or via Routing Information Protocol (RIP), Open Shortest Path First (OSPF), Intermediate System-to-Intermediate System (IS-IS), or other route distribution protocol.

As examples of the above, customer 108 ("CUST 108") is illustrated as having contracted with a co-location facilities provider for co-location facility 100A to directly access layer 3 cloud services from cloud service provider 110A via cloud exchange point 128. Customer 108 is illustrated as having contracted with partner NSP 106 coupled to the MPLS VPN 132 network. For example, customer 108 (e.g., located in Dallas) is illustrated as having contracted with NSP 106 to access layer 3 cloud services of a different metropolitan area (e.g., of Chicago) via a transit network through NSP 106. In this way, customer 108 receives an end-to end connection with redundant layer 3 connectivity to cloud service provider 136, for instance.

The contracts described above are instantiated in network infrastructure of the cloud exchange point 128 by L3 peering configurations within switching device NSP 106 and cloud exchange point 128 and L3 connections, e.g., layer 3 virtual circuits, established within cloud exchange point 134 to interconnect cloud service provider networks 136 of a different metro to NSP 106 and customer 108 network, all having at least one port offering connectivity within one or more of the cloud exchange points 134.

In some examples, co-location facilities 100 allow customer 108 to be directly inter-connected to cloud service providers 136, via a virtual layer 2 (L2) or layer 3 (L3) connection through a connection with partner network service provider, e.g., NSP 106. In this way, customer 108 of one metropolitan area may receive an end-to-end connection 113 with L2 or L3 connectivity to cloud service providers 136 of a different metropolitan area.

A partner NSP, e.g., NSP 106, may represent a respective network service provider that is associated with a transit network of a corresponding metropolitan area by which network subscribers of the partner NSP 106 may access cloud services offered by CSPs 136 via co-location facility 100B. In general, customers of cloud service providers may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by CSPs 110, 136 via the co-location facilities 100A, 100B.

In this way, co-location facilities 100 streamline and simplify the process of partnering CSPs 136 of one metropolitan area and customer 108 of a different metropolitan area via partner NSP 106 in a transparent and neutral manner. In one example, each of the co-location facilities 100 is an interconnection data center in which CSPs, NSPs and/or customers may already have network presence, such as by having one or more accessible ports available for interconnection between the data centers and respective network service providers, which may represent any of cloud exchange points 128, 134 from corresponding co-location facilities 100A, 100B, respectively. This allows the participating NSPs, customers, and CSPs to have a wide range of interconnectivity options within separate facilities of different metropolitan areas. In this way, a carrier/customer may have options to create many-to-many interconnections with only a one-time hook up to one or more cloud exchange points 134 via partner NSP 106 without the customer's need to negotiate and contract services directly with the respective network service providers and to connect via physical cross connect in each corresponding metropolitan area. In other words, instead of a customer having to establish separate connections across transit networks to access cloud service providers of a different metro, co-location facilities 100 allow customers to interconnect to multiple CSPs and cloud services of the different metro through the connection of pre-provisioned NSPs.

System 2 includes a programmable network platform 120 for dynamically programming each of co-location facilities 100 to responsively and assuredly fulfill service requests that encapsulate business requirements for services provided by co-location facilities 100 and/or cloud service providers 110, 136 across different metropolitan areas. The programmable network platform 120 as described herein may, as a result, orchestrate a business-level service across heterogeneous cloud service providers 110, 136 of different metropolitan areas (e.g., Dallas and New York) according to well-defined service policies, quality of service policies, service level agreements, performance, benchmarking, existing relationship, and costs, and further according to a service topology for the business-level service.

Programmable network platform 120 enables the co-location facility provider that administers the co-location facilities 100 to dynamically configure and manage the co-location facilities 100 to, for instance, facilitate virtual connections with a partner NSP (e.g., NSP 106) for cloud-based services delivery from networks located in one metro to one or more networks located in another metro. For example, co-location facilities 100 may enable customer 108 that are not physically connected cloud services providers 136 of a different metro to access the cloud service providers 136 to improve performance, reduce connectivity time, increase assurance of the connections across the metro areas, and leverage cloud computing for additional applications across metros. In this way, enterprises, network carriers, and SaaS customers, for instance, can, at least in some aspects, integrate cloud services with their internal applications as if such services are part of or otherwise directly coupled to their own data center network.

Programmable network platform 120 may represent an application executing within one or more data centers of the co-location facilities 100 or alternatively, off-site at a back office or branch of the cloud provider, for instance. Programmable network platform 120 may be distributed in whole or in part among the data centers, each data center associated with a different cloud exchange point 128, 134 to make up the co-location facilities 100. As illustrated in FIG. 2, programmable network platform 120 may control service provisioning for multiple different cloud exchanges via a partner NSP. Alternatively, or additionally, multiple separate instances of the programmable network platform 120 may control service provisioning for respective cloud exchanges.

In the illustrated example, programmable network platform 120 includes a service interface (or "service API") 114 that defines the methods, fields, and/or other software primitives by which applications 130 may invoke the programmable network platform 120. The service interface 114 may allow NSP 106, customer 108, cloud service providers 110, 136, and/or the co-location facilities provider programmable access to capabilities and assets of the respective co-location facilities 100.

Applications 130 may include a customer portal that presents NSP inter-metro network connectivity offerings. In some examples, the customer portal may display, to a customer, a selectable list of NSPs that describes characteristics of inter-metro network connectivity via the NSP network. Such characteristics may include bandwidth, service-level agreements, quality, performance, and price for each network connectivity offering. The customer portal may enable a customer to input an indication of a selected NSP offering from the list of NSP network connectivity offerings. In response to the indication, the customer portal may send, via service interface 114, an indication of the selected NSP offering in a request for an interconnection between a customer network port in a cloud exchange 128 and a cloud service provider network port in a cloud exchange 134. In response to the request, programmable network platform 120 may create virtual connections between the customer network port in cloud exchange 128 and a port of the selected NSP network in cloud exchange 128 as well as between the customer/cloud service provider network port in cloud exchange 134 and a port of the selected NSP network in cloud exchange 134. The selected NSP network transports data between respective ports of the selected NSP network in cloud exchanges 128, 134 to facilitate the end-to-end connection 113.

For example, and as further described herein, the service interface 114 may facilitate machine-to-machine communication to enable dynamic provisioning of virtual circuits in the cloud exchange for interconnecting customer and cloud service provider networks of different metros via a partner NSP, e.g., NSP 106. In this way, the programmable network platform 120 enables the automation of aspects of cloud services provisioning for different metropolitan areas. For example, the service interface 114 may provide an automated and seamless way for customers to establish, de-install and manage interconnection with a partner NSP to connect to multiple, different cloud providers of a different metropolitan area participating in the cloud exchange.

Further example details of cloud-based services exchanges can be found in U.S. patent application Ser. No. 15/099,407, filed Apr. 14, 2016 and entitled "Cloud-Based Services Exchange;" and in U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" AND U.S. patent application Ser. No. 14/927,306, filed Oct. 29, 2015 and entitled "ORCHESTRATION ENGINE FOR REAL-TIME CONFIGURATION AND MANAGEMENT OF INTERCONNECTIONS WITHIN A CLOUD-BASED SERVICES EXCHANGE;" each of which are incorporated herein by reference in their respective entireties.

As shown in FIG. 2, programmable network platform 120 may include telemetry data 146 and service data 148. Telemetry data 146 may include metrics about the quantity, type, and definition of network and resource configurations that are configured by programmable network platform 120. Telemetry data 146 may include analytics information from infrastructure data collectors based on raw metrics data for resources used in a particular service. Service data 148 may include, for example, service temporal data, service spatial data, service aggregate data, service support data, and service provisioning time data.

In some examples, telemetry data 146 may include information that indicates connections of co-location facility customers to co-location facility points. For instance, a co-location facility customer may include a service customer or cloud service provider. In some examples, a connection may be a physical or logical (e.g., L2 or L3) coupling between a co-location facility customer in a network (e.g., customer network or provider network) and a co-location facility point. Telemetry data 146 may include information that indicates interconnections between co-location facility customers at a co-location facility point. In some examples, an interconnection may be a physical or logical coupling between at least two co-location facility customers in a co-location facility point.

As shown in FIG. 2, controller 50 may be operably coupled to programmable network platform 120. In other examples, controller 50 may be implemented within programmable network platform 120. In some examples, controller 50 may be implemented within metro-based co-location facilities 100. In any case, controller 50 may be operably coupled to programmable network platform 120, such that controller 50 may communicate with programmable network platform 120. As described in this disclosure, controller 50 may be implemented in hardware, software, or a combination of hardware and software. For example, controller 50 may be executed by one or more real servers or virtual machines in any of the co-location facilities described herein or a branch office of the facilities provider, or by another suitable computation environment. Aspects of controller 50 may be executed in a distributed manner. For example, generation of the controller may be performed by one or more servers.

In accordance with techniques of the disclosure, in response to receiving a request 150, e.g., from customer 108, controller 50 may generate an inter-metro service chain, based at least in part on telemetry data 146 and service data 148, using the end-to-end connection 113 for customer 108. In operation, controller 50 may receive a request 150 for a plurality of services. As further described below, controller 50 may determine that a plurality of cloud service providers of geographically distributed metros best satisfy request 150. To generate an inter-metro service chain for application of the plurality of services, controller 50 may obtain service performance information from programmable network platform 120. The data describing service performance within the co-location facilities 100 includes data measured by the co-location facility provider and characteristics of the cloud service provider independent of information provided by the cloud service providers 110, 136. Programmable network platform 120 may include service interface 114 that may exchange information with applications 130 and controller 50. Controller 50 may obtain service performance information based at least in part on querying telemetry data 146 and service data 148. For instance, controller 50 may determine a co-location facility customer identifier that identifies a particular co-location facility customer (e.g., a CSPs 110 or CSPs 136). Controller 50 may send a request or query to programmable network platform 120 for information relating to the CSPs 110, 136. In some examples, the set of interconnections may specify service identifiers of services provided by CSPs 110, 136, geographic locations of co-location facilities in which CSPs 110, 136 offer services, and/or identifiers of co-location facilities that include the services, to name only a few examples.

Controller 50 may, via the end-to-end connection 113, use the data described above to generate an inter-metro service chain for application of a plurality of services offered by cloud service providers located in different co-location facilities of geographically distributed metropolitan areas. For instance, controller 50 may apply a service overlay model to the data described herein to generate a service performance score for the particular cloud service provider. The application of a service overlay model may involve machine learning algorithms that can receive and analyze multiple input variables populated by multi-factor data describing service performance within co-location facilities 100 as measured by the co-location facility provider, and characteristics of the cloud service provider independent of information provided by cloud service providers 110, 136. Machine learning algorithms may include, but are not necessarily limited to, algorithms such as neural networks, random forest, k-means, k-nearest neighbors, linear regression, decision tree, naïve Bayes classifier, support vector machines, and Gaussian processes. Additional description of service overlay models is found in U.S. patent application Ser. No. 15/099,428, filed Apr. 14, 2016, entitled "SERVICE OVERLAY MODEL FOR A CO-LOCATION FACILITY," the entire content of which is incorporated by reference herein.

Controller 50 may apply machine learning algorithms to historical data to identify the relative importance of each input variable. Controller 50 may use machine learning algorithms to fine-tune the service overlay model. Specifically, controller 50 may apply machine learning algorithms to historical data to measure how accurately the service overlay model predicted previous indications of service performance. Controller 50 may use machine learning algorithms to calibrate the service overlay model by adjusting the weights associated with each input variable.

In some examples, controller 50 applies a least squares method for machine learning. Controller 50 may apply the service overlay model to a set of historical data, and may measure each of the inaccuracies of the service overlay model's prediction. Using the least squares method, for example, controller 50 may quantify and square the magnitude of each inaccuracy. Controller 50 may then apply one or more additional service overlay models and may square the magnitude of each inaccuracy for each service overlay model. In this example, using the least squares method, controller 50 may then select the service overlay model with the lowest sum of squares.

Controller 50 may have one or more input variables to which controller 50 applies a service overlay model. By identifying the relative importance of each input variable, controller 50 may assign weights to each input variable. For example, if controller 50 examines the historical data and identifies latency as a relatively important input variable and power usage as a relatively unimportant input variable, controller 50 may assign a relatively high weight to latency and a relatively low weight to power usage. Controller 50 may use a machine learning algorithm such as least squares to calibrate the weights of each input variable to minimize errors. There are many other machine learning algorithms that controller 50 may use, in addition to or in the alternative to least squares, such as neural networks, random forest, Bayesian algorithms, k-means, support vector algorithms, and so forth.

In one example, controller 50 may assign specific weights to each input variable. The specific weights that controller 50 assigns may correspond to the importance or influence of each input variable. Through the use of machine learning algorithms in this example, controller 50 may adjust the specific weights for one or more input variables based on recent data. The receipt of data relating to customers that recently chose to obtain services as recommended by controller 50 or chose not to obtain services as recommended by controller 50 may prompt controller 50 to adjust the specific weights for one or more input variables. Example input variables include information from telemetry data 146 and service data 148.

Based on the service overlay model, controller 50 may determine the plurality of cloud service providers that best satisfy the customer service request 150 for generation of the inter-metro service chain. In response to determining the plurality of cloud service providers that best satisfy the customer service request 150, controller 50 may generate a label stack for the inter-metro service chain such that traffic may traverse along end-to-end connection 113 to provide customer 108 access to a plurality of cloud service providers (e.g., CSP 110A and CSP 136A) of different metros.

As described above and further described below, controller 50 may allocate one or more unique labels associated with the identifiers described above to provide service reachability to services offered by one or more cloud service providers of different metros. Controller 50 may use these labels to generate a label stack for the inter-metro service chain and append this information as a source route to data packets from customer 108. In this way, controller 50 may map the customer service requests 150 into a stack of labels to identify CSPs of geographically distributed metropolitan areas to provide the customer with an inter-metro service chain.

Figure 3:
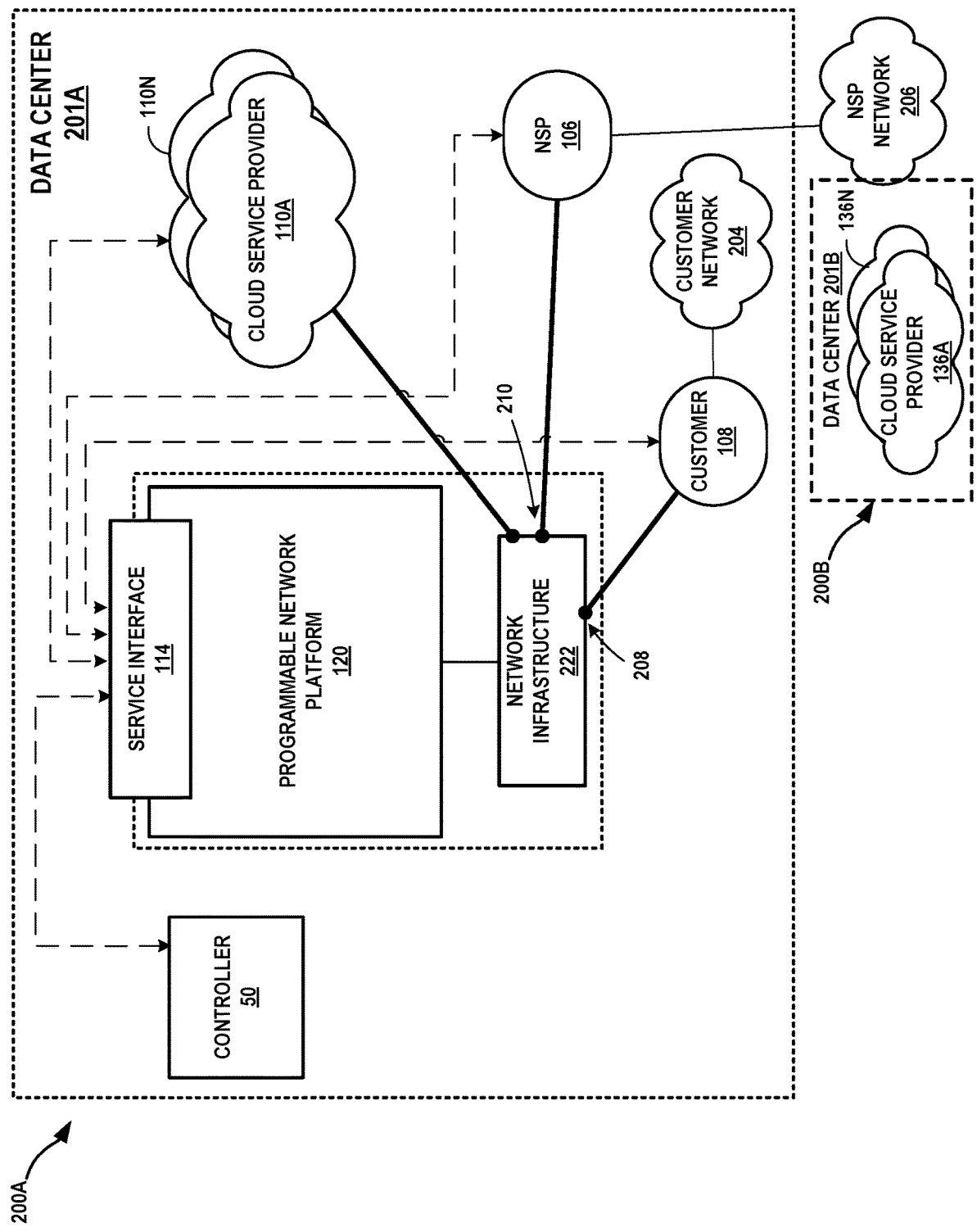
FIG. 3 is a block diagram illustrating a high-level view of a data center that provides an operating environment for a co-location facility, in accordance with techniques of the disclosure.

FIG. 3 is a block diagram illustrating a high-level view of a data center 201A that provides an operating environment for a co-location facility 200A, and a controller 50 that generates inter-metro service chains for customers, in accordance with techniques of the disclosure. Co-location facility 200A may be an example of any of co-location facilities 42 of FIG. 1 and co-location facilities 100 of FIG. 2. Co-location facility 200A allows a customer network 204 and NSP network 206 ("private" or "carrier" network 206) of NSP 106 or other customers including customer 108 to be directly inter-connected to any other cloud service provider 136A-136N (collectively, "cloud service providers 136" or "CSPs 136") of data center 201B (which may also be illustrated similarly as data center 201A) located in co-location facility 200B of another metropolitan area via partner NSP 106 and NSP network 206. Connecting in this way allows the application of services offered by cloud service providers 110 of one metro and services offered by cloud service providers 136 of a different metro, all of which is provided by co-location facility 200A.

Data center 201A may be entirely located within a centralized area, such as a warehouse or localized data center complex of a corresponding metropolitan area (e.g., Dallas), and provide power, cabling, security, and other services to NSPs, customers, and cloud service providers that locate their respective networks within data center 201A (e.g., for co-location) and/or connect to the data center 201B by one or more external links via NSP 106.

CSPs 110, 136 may each offer such services as Software-as-a-Service (SaaS), Platform-aaS (PaaS), Infrastructure-aaS (IaaS), Virtualization-aaS (VaaS), and data Storage-aaS (dSaaS), via the co-location facility 200A. In general, customers of CSPs 110, 136 may include network carriers, large enterprises, managed service providers (MSPs), as well as other customers generally seeking any of the SaaS, PaaS, IaaS, VaaS, and dSaaS services offered by CSPs 110, 136.

Network service provider 106 may represent a network service provider that is associated with a transit network by which network subscribers of NSP 106 may access services offered by CSPs 110, 136 via the co-location facility 200A. In accordance to the techniques of this disclosure, partner NSP 106 may represent a network service provider that is associated with transit network by which network subscribers of NSP 106 (e.g., customer 108) may access cloud services offered by CSPs for a different metropolitan area via co-location facility 200A. In this way, co-location facility 200A streamlines and simplifies the process of partnering CSPs of one metro and customers of a different metro in a transparent and neutral manner.

One example application of co-location facility 200A is an interconnection data center 201A in which CSPs, NSPs, and/or customers of data center 201A may already have network presence, such as by having one or more accessible ports available for interconnection within data center 201A. In some examples, a partner NSP, e.g., NSP 106, may also have one or more accessible ports available for interconnection within data center 201A. This allows the participating carriers, customers, and CSPs to have a wide range of interconnectivity options in separate facilities via partner NSP 106. Co-location facility 200A of data center 201A includes network infrastructure 222 that provides an L2/L3 switching fabric by which CSPs 110, 136 and customers/NSPs interconnect. In the example of FIG. 3, network infrastructure 222 represents the co-location facility switching fabric and includes multiple ports that may be dynamically interconnected with virtual circuits by, e.g., invoking service interface 114 of the programmable network platform 120. Each of the ports is associated with NSP 106, customer 108, and CSPs 110, 136. This enables an NSP customer to have options to create many-to-many interconnections with only a one-time hook up to the switching network and underlying network infrastructure 222 that presents an interconnection platform for co-location facility 200A. In other words, instead of having to establish separate connections across transit networks to access different cloud service providers or different cloud services of another metro, co-location facility 200A allows customer to interconnect to multiple CSPs and cloud services of the different metro using network infrastructure 222 within data center 201A, which may represent any of the edge networks described in this disclosure, at least in part.

By being connected to and utilizing co-location facility 200A, customer 108 can purchase services and reach out to many customers in many different geographical areas of different metropolitan areas without incurring the same expenses typically associated with installing and maintaining multiple virtual connections with multiple CSPs 110, 136 across various NSPs. For example, customer 108 can expand its services using NSP 106. By connecting to co-location facilities 200A, customer 108 may use network services of NSP 106 to access other cloud service providers of remote metros through co-location facility 200A.

Co-location facility 200A includes a programmable network platform 120 that exposes at least one service interface, which may include in some examples and are alternatively referred to herein as application programming interfaces (APIs) in that the APIs define the methods, fields, and/or other software primitives by which applications may invoke the programmable network platform 120. The software interfaces allow NSP 106 and customer 108 programmable access to capabilities and assets of the co-location facility 200A corresponding to data center 201B of a different metropolitan area. The programmable network platform 120 may alternatively be referred to as a controller, provisioning platform, provisioning system, service orchestration system, etc., for establishing end-to-end services including, e.g., connectivity between customers of one metro-based network and cloud service providers of a different metro-based network via partner NSPs according to techniques described herein.

As further described herein, service interface 114 facilitates machine-to-machine communication to enable dynamic service provisioning of virtual circuits in the co-location facility for interconnecting a customer and cloud service provider networks of different metros. In this way, the programmable network platform 120 enables the automation of aspects of cloud services provisioning for inter-metro connectivity. For example, the software interfaces may provide an automated and seamless way for customers to establish, de-install and manage interconnection with multiple, different cloud providers via partner NSPs participating in the co-location facility. The programmable network platform 120 may in various examples execute on one or more virtual machines and/or real servers of data center 201A, or off-site.

As shown in FIG. 3, data center 201A may include controller 50 operated by the co-location facility provider of data center 201A. Controller 50 has a view of all the services being offered by data center 201A, and potentially of other data centers, e.g., data center 201B. Controller 50 may be operably coupled to programmable network platform 120, such that controller 50 may communicate with programmable network platform 120. In accordance with techniques of the disclosure, controller 50 may determine service-related scoring data for cloud service providers 110, 136, and generate an inter-metro service chain based on the scoring data for a co-location facility customer.

In some examples, controller 50 generates service characterization information used to generate an inter-metro service chain for customers or potential customers, in accordance with techniques of the disclosure. Controller 50 may receive a request for services from a co-location facility customer or potential co-location facility customer. In some examples, the customer may be a customer 108 located in data center 201A. In other examples, the customer may be another customer located external to data center 201A and connecting to data center 201A via NSP 106.

Controller 50 may query telemetry data associated with interconnections established between customer 108 and cloud service providers 110 at data center 201A and cloud service providers 136 at data center 201B. Controller 50 may query service data associated with cloud service providers 110, 136. Controller 50 may query telemetry data and service data for co-location facilities other than co-location facility 200A and data center 201A, e.g., data center 201B. Controller 50 may apply a service overlay model to the telemetry data and service data and generate an inter-metro service chain for customer 108.

In some examples, controller 50 may generate a service overlay model using one or more of: (i) data describing a temporal view of services in one or more co-location facilities (including for example, data centers 201A, 201B), (ii) data describing a spatial view of services in one or more co-location facilities, (iii) data describing an aggregate view of services in one or more co-location facilities, (iv) data describing a support view of services in one or more co-location facilities, and (v) data describing a service provisioning view in one or more co-location facilities. The service overlay model may be based upon data relating to one or more of the above types of data.

In these and other examples, controller 50 may use one or more machine learning algorithms as part of generating the service overlay model. Machine learning algorithms applied by controller 50 may take many forms and may include various variable importance measuring methods like regression analysis, Gini importance, permutation importance, and other measurements for determining statistical significance. Regression analysis may provide an equation, algorithm, and/or coefficients for a multi-variable analysis that, when applied to data described herein, produces a recommendation of services. Controller 50 may periodically perform regression analysis or another tool using then-existing data to update the equation or algorithm for future use.

In some examples, controller 50 collects data regarding services applied by one or more cloud service providers via co-location facilities such as data centers 201A, 201B, and analyzes the data to obtain a temporal view of services provided in data centers 201A, 201B. The term "temporal view of services" refers to information indicating how services offered by various service providers (e.g., CSPs) in a particular data center are doing over time, such as how services fared in the past in the particular data center 201A or data center 201B and how the services are likely to perform in the future in data center 201A or 201B based on the information gathered over time. Since data centers constantly monitor their underlying service infrastructure all over the world, controller 50 can leverage the data collected by this monitoring to obtain a temporal view.

For example, administrators of data center 201A may measure and monitor traffic passing through its network infrastructure. The co-location facility provider may already send, measure and monitor test traffic from network infrastructure 222 to track adherence to SLAs. For example, the co-location facility provider associated with data center 201A may send test traffic from network infrastructure 222 within data center 201A to each of cloud service providers 110, 136 for application of network services to the test traffic, and can measure application performance by analyzing the test traffic. Controller 50 can invoke service interface 114 as an interface to network infrastructure 222, to trigger additional test traffic as needed to measure performance of services provided by cloud service providers 110, 136 over time. Controller 50 may be configured to invoke service interface 114 to network infrastructure 222 to send the test traffic on a periodic basis (e.g., hourly, daily, weekly), and/or upon one or more conditions being met, such as whenever a new service or cloud service provider 110, 136 becomes available. Over time, the co-location facility provider of data center 201A builds a temporal view of how applications or services offered by cloud service providers 110, 136 are doing in data center 201A.

In some examples, the temporal view may show a volume of traffic that passes through data centers 201A, 201B over time period such as a week, a month, and a year. In some examples, the co-location facility provider can use the logs of the historical snap shots can to build a predictive model for future performance. The co-location facility provider can use the temporal view and accompanying predictive model to characterize a service in data centers 201A, 20B and help customers generate an inter-metro service chain from among the multiple cloud service providers 110.

For example, if a customer 108 is interested in receiving services provided by cloud service providers 136, and needs those services at a specified time in the future but has flexibility as to which of a plurality of data centers to connect to for receiving the services, controller 50 may apply a service overlay model based on the temporal view to recommend to customer 108 one data center as being predicted to have a lighter traffic load for the specified time as compared to a second data center that is predicted to have a higher traffic load for the specific time. In this manner, the service overlay model can model how certain amounts of traffic or congestion are likely to occur in certain locations, e.g., based on seasonal fluctuations or around recurring major events (e.g., major broadcast sporting events). The controller 50 provides this additional information as an "overlay" to the basic information regarding simply what services are offered by the different cloud service providers.

In some examples, controller 50 collects data regarding services applied by one or more cloud service providers via co-location facilities such as data centers 201A, 201B, and analyzes the data to obtain a spatial view of services provided in data centers 201A, 201B. The term "spatial view of services" refers to information indicating the geographical regions from which the customer can select services or sets of services. This view of services can be important, as multiple data centers in multiple regions or metros may offer similar services. Multi-cloud data centers usually operate in geographically diverse regions facilitating connectivity to customers all around. Spatial diversity of service offering models is another aspect data centers should consider.

For example, as in FIG. 1, the same sets of CSPs may be present in multiple geographical regions. In some cases, services provided by cloud service provider 110 are offered inexpensively in one metro in a region compared to the same services offered by cloud service providers 136 of another metro. This may happen due to a lower cost to cloud service provider 110 to run those services in that metro or even a current promotion by cloud service provider 110 to attract customers in a particular metro, for example. In some cases, hosting data centers can have different pricing structures for various metros, with these different costs being passed on by cloud service providers 110 to customers. Controller 50 can collect and analyze data relating to the spatial view of services, and generate a service overlay model based at least in part on the spatial view of services. When data center 201A receives a request from a customer or potential customer for services, in some examples controller 50 generates an inter-metro service chain based on information characterizing the services in terms of spatial characteristics, such as cost of services provided in different geographical regions. This can help the customer in connecting to cloud service providers 136 via NSP 106.

In some examples, controller 50 collects data regarding services applied by cloud service providers via co-location facilities such as data centers 201A, 201B, and analyzes the data to obtain an aggregate view of services provided by the data centers. The term "aggregate view of services" refers to information indicating a brokerage capability of the data centers, such as data centers 201A, 201B. That is, the data centers can receive a set of service requirements from a customer (e.g., an enterprise), and guide the enterprise to which a set of CSPs (in case of a service chain) in which data centers will provide the best choice for the received service requirements. For example, the controller 50 may identify a service chain for application of a plurality of services by different cloud service providers in the service chain, such as by identifying a lowest cost cloud service provider for providing each of the plurality of services.

The co-location facility provider for data centers 201A, 201B has the information of which various CSPs that are tenants in data centers 201A, 201B and various services offered by those CSPs, the cost structure offered by the CSPs, and the co-location facility provider collects data regarding service performance in data centers 201A, 201B. Given a set of service requirements by customers, controller 50 can, in some examples, offer the role of a "cloud broker." Based on the aggregate view of services, controller 50 can help the enterprises decide which cloud vendors will be the best choice for the enterprise's application needs, and which data centers offer the cost-effective, efficient, and optimal choice. Controller 50 may generate the inter-metro service chain based on the aggregate view of services.

For example, a potential enterprise customer provides information specifying a list of services the enterprise is looking for, such as compute services, content delivery network services, firewall services, network address translation (NAT) services, applications/software services, platform services, infrastructure services, virtualization services, server services and data storage services. Controller 50 has information about which of cloud service providers 110, 136 in data centers 201A, 201B, respectively, provides the best storage services in terms of cost, throughput performance, and latency. Controller 50 likewise has information about the compute and storage services provided by each of the cloud service providers 110, 136. Controller 50 can generate the inter-metro service chain to particular cloud service providers 110, 136 that provide the needed services in a way that suits the enterprise's needs. For example, controller 50 can offer to route the enterprise customer's traffic through a service chain consisting of firewall services by cloud service provider 110A, storage services by cloud service provider 136A, and other services by other cloud service providers, at a specified cost. In some examples, controller 50 may output this recommendation for display to the enterprise customer.

In some examples, controller 50 collects data regarding services applied by one or more cloud service providers via co-location facilities such as data centers 201A, 201B, and analyzes the data to obtain a support view of services provided in the data centers. Another important attribute of the service overlay model by which services can be characterized is the support assurances provided by data centers for those services. The term "support view of services" refers to data indicating how quickly a data center resolves customer issues. Support infrastructure such as multi-providers agreements or network operations center (NOC)-to-NOC agreements signed in a data center may influence resolution time significantly, and is an important attribute to consider.

For the same services, it may happen one data center has an edge over another in terms of support agreement between the data center and its CSP tenants or even between data center and customers, such as NSPs, to resolve a service-impacting issue with faster resolution time. Typical examples would include backhaul networks where services are offered from same CSP, but data centers may have to deal with multiple providers (such as Dark Fiber providers) in the middle before services reach end customers. This may result in complex multi-provider agreements and resolution of an issue seen by customers may take more time compared to another data where similar issues may not be present.

The support agreements may be used as parameters for controller 50 to quantify the support provided by data centers. Some CSPs may have more primitive agreements; others may have more comprehensive, sophisticated agreements. These aspects can be quantified and included as part of the service overlay model, and thereby presented to potential customers. A potential customer may, in some examples, be able to specify an amount of downtime due to support issues that they can tolerate. Perhaps a first potential customer can deal with 15 minutes to 1 hour of downtime due to support issues, while a second potential customer needs fantastic support service, e.g., guaranteed less than 15 minutes to resolve any issue. Controller 50 can provide information to the potential customers characterizing the service offerings of various CSPs based at least in part on the customer's service support needs and the support view of services aspect of the service overlay model. In some examples, controller 50 provides a recommendation to the potential customer based on the support view of services.

In some examples, controller 50 collects data regarding services applied by one or more cloud service providers via co-location facilities such as data centers 201A, 201B, and analyzes the data to obtain a service provisioning view of services provided in the data centers. The term "service provisioning view of services" refers to an amount of time it takes for a data center to adopt a customer.

An important consideration for enterprises is the speed by which services required by them are provisioned in a data center. An enterprise may find information about likely service provisioning time to be helpful in selecting a data center from which to receive the services. Controller 50 may collect and store information relating to infrastructure, logistics, administration, agility, available capacity, and capacity planning associated with data centers, as some of the factors that may influence service provisioning time. Controller 50 may analyze the collected data to generate an estimated service provisioning time for different data centers. It may happen that one data center can ensure faster implementation than another, and controller 50 can guide customers based on a service provisioning view of services aspect of the service overlay model. In some examples, controller 50 collects historical data relating to actual service provisioning times, and includes this as a component of the service overlay model for predicting future service provisioning times.

Controller may present information to a potential customer indicating that in co-location facility 42A, it will take about one day to bring up the desired services, and in co-location facility 42C, it will take three to four days to bring up the desired services. These predicted service provisioning times may be for the same services provided by the same cloud service provider in the different co-location facilities.

In this manner, data centers such as data center 201A can build the service overlay model over and above CSP-offered services by building application visibility, geographical diversity, cost modelling of the services, performance predictive modelling capability, cloud brokerage capability, support and provisioning infrastructure capability. The data center can leverage its unique position in having a neutral infrastructure and view of the entire data center ecosystem, and leverage some data already being collected, to provide intelligent service characterization and add value to customers by generating a service chain for a set of service providers that are located in geographically distributed metros that best meet the customer's needs. The data center's multi-cloud provider model can allow the ability to offer a multi-cloud service chain solution for the customer's various service needs, using network functions virtualization (NFV) techniques.

Another advantage comes with respect to policy specification. In the example of FIG. 3, a customer 108 can specify a single policy at a customer interface to programmable network platform 120, and programmable network platform 120 can push the policy across all the NFVs across all the multiple cloud service providers 110, 136. This avoids the customer having to enter policies multiple different times, for each cloud service providers 110, 136. In this way, the customer can be offered a multi-cloud service chain solution to their service needs, and then simply enter a single policy and rely on programmable network platform 120 to do the work of translating the single policy to multiple policies for services provided by the different cloud service providers 110, 136.

Controller 50 may, based on the data describe above, determine that services offered by CSPs of remote metros are preferred. As further described below, to generate the service chain to include these remote services, controller 50 may allocate unique labels for data centers 201A, 201B, CSPs 110, 136, each connection between a co-location facility customer in a customer or provider network and a co-location facility point, and each interconnection that couples at least two co-location facilities. Controller 50 may append the label stack to customer data packets as a source route. In this way, the generated label stack may fulfill the desired service request.

Figure 4:
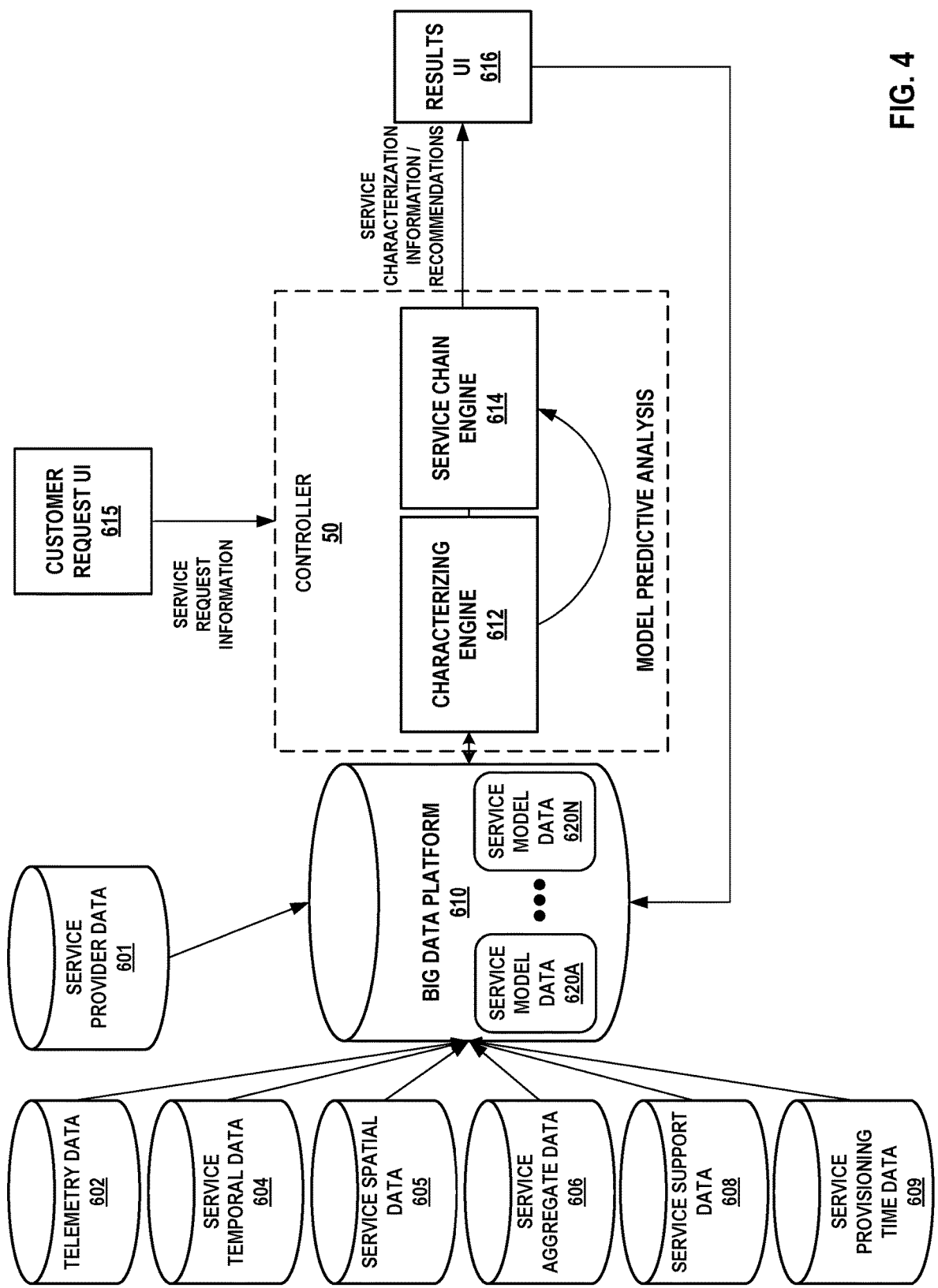
FIG. 4 is a conceptual diagram of components used to generate a service overlay model, in accordance with techniques of this disclosure.

FIG. 4 is a conceptual diagram of components used to generate an inter-metro service chain, in accordance with techniques of this disclosure. Each of components 602-616 and 50 may be implemented in hardware, software, or a combination of hardware and software. As shown in FIG. 4, controller 50 may include a characterization engine 612, which analyzes various types of data to generate a service overlay model characterizing one or more services in accordance with techniques of this disclosure, and a service chain engine 614, which applies the service overlay model to a customer request to generate an inter-metro service chain for application of services provided by cloud service providers of geographically distributed metros. In some cases, characterization performs predictive analytics to predict future characteristics, e.g., performance, of the one or more services. To generate the service overlay model, controller 50 may query big data platform 610 for information, such as but not limited to service model data, service performance data, customer data, co-location facility customer information, connection and interconnection information, co-location facility information, power and network usage data, to name only a few examples. Using this information, controller 50 may generate the service overlay model characterizing the services and apply the service overlay model to service request information to generate service characterization information that is used to generate the inter-metro service chain for customers or potential customers.

In the example of FIG. 4, big data platform 610 may provide analysis, capture, data curation, search, sharing, storage, transfer, visualization of data received from, but not limited to, service provider data 601, telemetry data 602, service temporal data 604, service spatial data 605, service aggregate data 606, service support data 608, service provisioning time data 609, and service model data 620A-620N. In some examples, each of service provider data 601, telemetry data 602, service temporal data 604, service spatial data 605, service aggregate data 606, service support data 608, service provisioning time data 609, and service model data 620A-620N may be implemented in a Relational Database Management System (RDBMS), Object Database Management System (ODBMS), Online Analytical Processing (OLAP) system, or Big Data Computing system, to name only a few examples. Big data platform 610 may receive data from one or more of service provider data 601, telemetry data 602, service temporal data 604, service spatial data 605, service aggregate data 606, service support data 608, service provisioning time data 609, and service model data 620A-620N on a periodic, user prompted, or real-time basis.

Service provider data 601, telemetry data 602, service temporal data 604, service spatial data 605, service aggregate data 606, service support data 608, service provisioning time data 609, and service model data 620A-620N may include data associated with several different co-location facilities, such as data centers in different metros and different regions, for example.

Service provider data 601 may include information about each of multiple cloud service providers 110, 136 that are customers of a co-location facility, such as types of services offered by the cloud service providers, prices offered by the cloud service providers for the services (including promotional offerings), and other cloud service provider data. Examples of services offered by cloud service providers 110, 136 include one or more of compute services, content delivery network services, firewall services, network address translation (NAT) services, applications/software services, platforms services, infrastructure services, virtualization services, server services and data storage services.

Telemetry data 602 may include metrics about the quantity, type, and definition of network and resource configurations that are configured by programmable network platform 120. Telemetry data 602 may include analytics information from infrastructure data collectors based on raw metrics data for resources used in a particular service. In some examples, telemetry data 602 includes connection information that describes a connection that a co-location facility customer has to a co-location facility network. In some examples, telemetry data 602 includes interconnection information that describes an interconnection between at least two customer networks at a co-location facility point or co-location facility. Telemetry data 602 may include metrics describing the transmission of data in or through a co-location facility by a particular co-location facility customer. Telemetry data 602 may indicate a current configuration of a co-location facility network for interconnecting customers.

In some examples, big data platform 610 may also analyze co-location data (not shown) such as customer data, power usage data, and network usage data. Customer data may include information that identifies a co-location facility customer, billing information for the co-location facility customer, location information for the co-location facility customer, co-location/interconnection preference information for the co-location facility customer, to name only a few examples. Power usage data may include information that indicates the amount of electrical power consumed by servers and other equipment for a particular co-location facility customer (e.g., a service provider). Network usage data may include information that indicates the amount of data that a particular co-location facility customer has sent or received. Network usage data may include information describing the size and number of data transmissions corresponding to a particular co-location facility customer, to name only a few examples. Power usage data and network usage data may include information describing historical power usage and network usage for a particular co-location facility customer in order to provide reference for comparing the current or recent power usage and network usage.

Controller 50 also may receive configuration data from an administrator of the co-location facility provider specifying what metrics or reference points to include in the service overlay model. The administrator can select the metrics based on what information seems important to customers having a good experience with a service. For example, CSPs have various attributes they want to expose for the various services, indicating service performance (e.g., latency, bandwidth, number of packet drops, cost). However, these attributes are measured by the CSPs based on ideal conditions (e.g., with the customer in the same place as CSP), yet this information are not necessarily reflective of the actual end customer experience.

Moreover, every application comes with its own unique minimum and maximum characteristics that a network needs to have to run the application. The co-location facility provider can obtain the reference points for different types of services by analyzing CSP offerings, including how the CSPs advertise the attributes of their services, and application thresholds and levels, and determine what metrics to include in configuration data used for configuring the controller 50. The configuration data may include information for weighting different factors. Controller 50 in turn builds a model out of the various service characterizations included in the configuration data.

The co-location facility provider can measure this for each flow, for each suite of services, in each data center, for each CSP. The co-location facility provider may also have different test suites for the various services, and may send test traffic from the co-location facility provider's equipment to the different service providers to obtain actual performance data for various metrics. For example, the co-location facility provider may test a file transfer service and record how long it takes for a file transfer to occur. For example, controller 50 invokes service interface 114 to create a test point in a network of service provider 110A and initiated a file transfer from the test point network infrastructure 222 (FIG. 3). In this manner, the co-location facility provider emulates a customer to obtain data on how well the file transfer performs for this particular service provider 110A.

In some examples, the test traffic is sent periodically according to a defined schedule for the metric. In other examples, the test traffic is sent dynamically, such as in response to controller 50 determining that a new service provider has joined a co-location facility, or that a cloud service provider has added a service. In some examples, controller 50 may also monitor various data centers' usage patterns for every CSP.

Service temporal data 604 includes information indicating how services offered by various service providers (e.g., CSPs) in a particular data center are doing over time, such as how services fared in the past in data centers 201A, 201B and how the services are likely to perform in the future in data centers 201A, 201B based on the information gathered over time.

Service spatial data 605 includes data indicating the geographical regions from which the customer can select services or sets of services, including different data centers, metros, and regions. Service aggregate data 606 includes information about different cloud service providers by which comparison can be drawn between the different cloud service providers, and can be used by controller 50 to provide a brokerage function and for service chain provisioning.

Service support data 608 stores data indicating a support view of services, such as data indicating how quickly a data center resolves customer issues. This may include data associated with SLAs and other agreements in place between the data center and its service provider tenants and between the data center and customers.

Controller 50 collects data regarding services applied by one or more cloud service providers via co-location facilities such as data centers 201A, 201B, and analyzes the data to obtain a service provisioning view of services provided in data centers 201A, 201B. Controller 50 may analyze the collected data to generate an estimated service provisioning time for different data centers. Controller 50 stores the data to service provisioning time data 609.

Controller 50 may determine a service performance trend for a particular cloud service provider 110, 136 by using data indicating prior service performance for the cloud service provider 110, 136. Controller 50 may compare the data indicating prior service performance for the cloud service provider 110, 136 with service temporal data 604 indicating current service performance. For example, if the file transfer times for a file transfer service have increased or decreased, controller 50 may determine a service performance trend based on this information that controller 50 can incorporate into its multi-variable analysis.

As shown in FIG. 4, controller includes characterization engine 612 and service chain engine 614. In accordance with techniques of this disclosure, characterization engine 612 builds service model data 620A-620N ("service model data 620") for each of a plurality of different services. For example, characterization engine 612 selects a first service (referred to as "Service A") and selects a first service provider, e.g., service provider 110A. Characterization engine 612 may identify telemetry data 602 indicating interconnections established between the selected service provider 110A and other co-location facility customers. Characterization engine 612 may identify service temporal data 604 indicating how the selected service provided by the service provider 110A has performed over time. Characterization engine 612 may identify service spatial data 605 indicating how the selected service provided by service provider 110A perform in different data centers, metros, and/or regions. Characterization engine 612 may identify service aggregate data 606 indicating how the selected service provided by the service provider 110A performs and how the cost of the selected service offered by service provider 110A compare in different regions, such as based in part on data obtained from service provider data 601. Characterization engine 612 may identify service support data 608 indicating what levels of service support are available for the selected service provided by service provider 110A. Characterization engine 612 may identify service provisioning time data 609 indicating how long it takes for the selected service from service provider 110A to be provisioned.

If controller 50 determines that certain service-related data is not available for the cloud service provider, in some examples controller 50 may trigger sending of probes or test traffic to test the service performance of service provider 110A and obtain additional data to be stored in the service-related data repositories 604-609. Characterization engine 612 stores this data to service model data 620A characterizing service A based on a selected set of parameters. Characterization engine 612 may do this for every service provider that offers the service A, and for every data center in which service A is available. In this manner, characterization engine 612 may generate a service overlay model based at least in part on the data 601-609. Characterization engine 612 may use machine learning algorithms to modify the manner in which it generates service characterization information and/or recommendations.

Controller 50 can receive service request information from a customer or potential customer describing what services the customer is seeking, via customer request UI 615. In some examples, controller 50 may, via customer request UI 615, present the customer with questions designed to gather specific service request information that controller 50 needs to apply the service overlay model and generate service characterization data and/or recommendations, and the customer may enter the service request information in response to the questions. Questions controller 50 present may include, for example: what geographic area do you want to be located in? What types of services do you need? What level of service support do you need? For what dates do you need the services? How soon do you need the services provisioned? What order of services are preferred?

In some examples, customer request UI 615 and results UI 616 may be presented on the same user interface of a single display device. Customer request UI 615 and results UI 616 may include one or more user interface elements to receive or output information, such as but not limited to: labels, input fields, drop-down menus, buttons, images, tab controls, and navigation controls to name only a few examples. Customer request UI 615 and results UI 616 may be output by a web-based application executing on a server of the co-location facility provider, in some examples.

Service chain engine 614 applies the service overlay model to service request information received from customer request UI 615, generates an inter-metro service chain, and provides the inter-metro service chain for application of the services requested. In some examples, controller 50 outputs the service characterization information and/or recommendations of service chains for display via results UI 616 to a customer. Controller 50 may query service provider data 601 to identify a plurality of cloud service providers offering a service requested by a co-location facility customer. Controller 50 generates information comparing metrics associated with the service available via the co-location facility provider from the plurality of service providers that offer the service, based on information provided by the co-location facility customer and the service overlay model characterizing performance of the service. For example, controller 50 may query the particular service model data structure 620 that corresponds to the particular service, to obtain the information. In addition to guiding controller 50 to a particular service model data structure 620, the information provided by the customer may be used to filter the information that controller 50 obtains from the service model data structure 620 so that only information relevant to the customer is obtained when generating the information comparing the metrics associated with the service.

In some examples, the characterization engine 612 may score a cloud service provider according to the scores for other cloud service providers with similar characteristics, such as services offered, costs, business type, and facility location. The score may indicate a degree to which the offerings of the cloud service provider match with the needs of the customer based on the service request information. A service provider profile for a cloud service provider may also include pricing information for services, the service provider market segment(s), services offered or consumed, latency, bandwidth offered, file transfer speed, and other service provider or service performance data. Service provider data 601 may store such information as part of service provider profiles. Characterization engine 612 may compare the profiles of service providers with similar service offerings in order to generate a recommendation or ranking.

In some examples, characterization engine 612 may rank each service provider option based on the service characterization information and/or recommendations. This may be represented in the output displayed to a potential customer at results UI 616. In some examples, characterization engine 612 may score and/or rank different data centers according to how well suited their service offerings are to the customer's requirements (e.g., cost, performance, service provisioning time, etc), and output this information for display. In some examples, customer request UI 615 and results UI 616 may be presented on the same user interface of a single display device.

In some examples, characterization engine 612 may output for display the prices offered by the different CSPs in particular metro area(s). In some examples, results UI 616 may be generated by controller 50 and output to a display (e.g., a computer monitor or a tablet, smartphone, or PDA interface).

In some examples, the potential customer may interact with results user interface 616 to view potential cloud service providers and their service offerings in further detail. In some cases, the customer can make a selection of a cloud service provider or suggested service chain based on the service characterization information/recommendations, and controller 50 will invoke programmable network platform 120 to convey the selection and trigger instantiation of an interconnection between the customer and network infrastructure 222 for providing the selected services to the customer. This may be possible, for example, when the customer is already an existing customer of the co-location facility provider.

Different cloud service providers may offer different prices in different data centers. For example, costs at different data centers may differ, e.g., due to differing real estate costs in the different markets, cost of network connectivity in different data centers, etc. The co-location facility provider may charge the cloud service providers differently at the different data centers, and the service providers in turn will charge their customers differently based on the underlying cost. As another example, cloud service providers may run discounted price promotions in different data centers to encourage customers to join in locations having lower demand. For example, the Silicon Valley data center is oversubscribed so demand is high, so the cloud service provider has also set that data center price high, but the Washington, D.C. data center is cheaper because the cloud service provider is running a promotion. Many enterprise customers also have globally distributed locations, so the spatial comparison information would be helpful to them, because the enterprise customers could connect in either Silicon Valley or Washington, D.C. so the enterprise customers can choose the cheaper one. But, the performance may be slightly different in each DC, so this performance info can be presented to them too by characterization engine 612 and the customer can make a decision on the cost/performance trade-off based on the information provided by characterization engine 612.

Service chain engine 614 may generate an inter-metro service chain based on the information provided by characterization engine 612. In response, service chain engine 614 may generate unique labels to identify the data centers, corresponding CSPs of the data centers, and interconnections coupling different metros.

Figure 5:
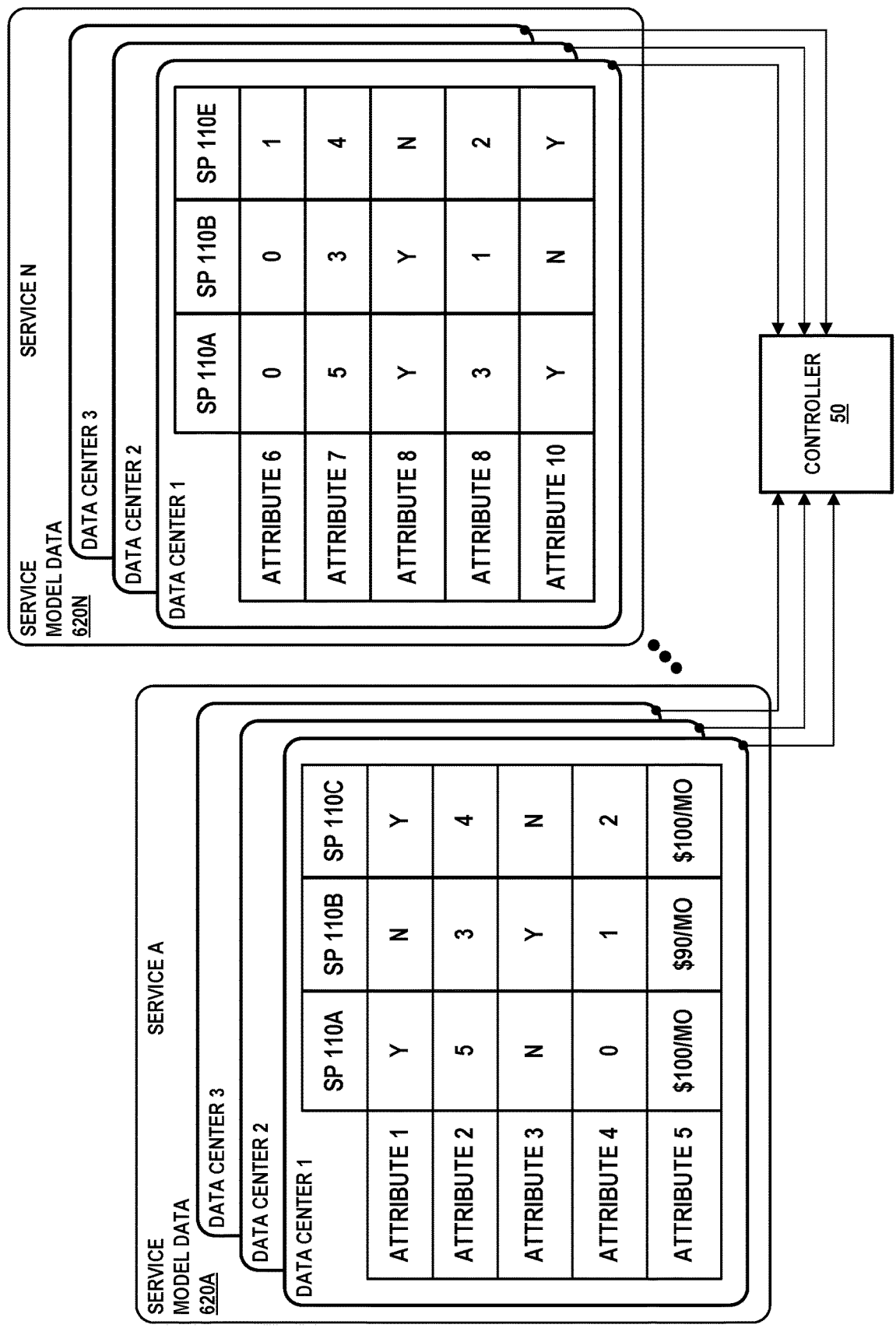
FIG. 5 is a block diagram illustrating example service model data of FIG. 4 in further detail, in accordance with one example aspect of the techniques of this disclosure.

FIG. 5 is a block diagram illustrating example service model data 620A-620N of FIG. 4 in further detail, in accordance with one example aspect of the techniques of this disclosure. In the example of FIG. 5, service model data 620A includes information associated with a first service ("service A"), for each of a plurality of data centers 1-3 in which service A is offered (e.g., co-location facilities 42A-42C of FIG. 1), and for each of a plurality of service providers 110, 136 offering service A in the data centers 1-3. Service A may be characterized by multiple attributes, in this example attributes 1-5. Service model data 620A includes entries associated with each attribute for the different service providers 110, 136. The entries may include data indicating a metric value for the attribute, such as a number, score, level, amount, or other metric value. For example, attributes for a storage service may include storage size (in GB), bandwidth, predicted latency, predicted file transfer time, monthly cost, service provisioning time, and whether service support is offered. Service model data 620A-620N may include first data obtained from the cloud service providers (e.g., cost, amount of bandwidth) as well as second data generated by the controller 50 describing the service based on attributes of the service as delivered by the cloud service providers and measured within one or more co-location facilities by the co-location facility provider (e.g., latency, file transfer time). The second data forming a service overlay over the first data to present a more comprehensive view of service delivery beyond merely that data which is available from the cloud service providers.

Service model data 620N includes information associated with a first service ("service N"), for each of a plurality of data centers 1-3 in which service N is offered (e.g., co-location facilities 42A-42C of FIG. 1), and for each of a plurality of service providers 110, 136 offering service N in the data centers 1-3. In some examples, the set of service providers offering service N may differ than the set of service providers offering service A, and similarly with the set of data centers in which the service is available. Service N may be characterized by multiple attributes, in this example attributes 6-10, which may be a different set of attributes than those for service A, although different services may share some common attributes (e.g., cost). Services may be characterized in terms of more or fewer attributes than depicted in FIG. 5.

In some examples, characterization engine 612 of controller 50 may obtain, generate, organize, or store service model data 620A-620N based on one or more of service provider data 601, telemetry data 602, service temporal data 604, service spatial data 605, service aggregate data 606, service support data 608, and service provisioning time data 609 (FIG. 4). Service chain engine 614 of controller 50 may also access service model data 620A-620N for generating inter-metro service chains based on the service characterization.

When controller 50 receives a request from a potential customer for one or more services of interest, controller 50 queries service model data 620 associated with the relevant services to obtain data for generating the inter-metro service chain. In some cases, controller 50 displays the generated inter-metro service chain to the customer, while in other examples, controller 50 may analyze the data to present a recommendation based on the data, such as a recommended service chain that provides the requested services. For example, controller 50 may present a recommendation for a service chain that provides individual services from cloud service providers 110 of data center 201A and from cloud service providers 136 of data center 201B.

In one example, controller 50 may generate an updated service overlay model periodically, such as once per month. In another example, controller 50 may generate an updated service overlay model more or less frequently than once per month.

Figure 6:
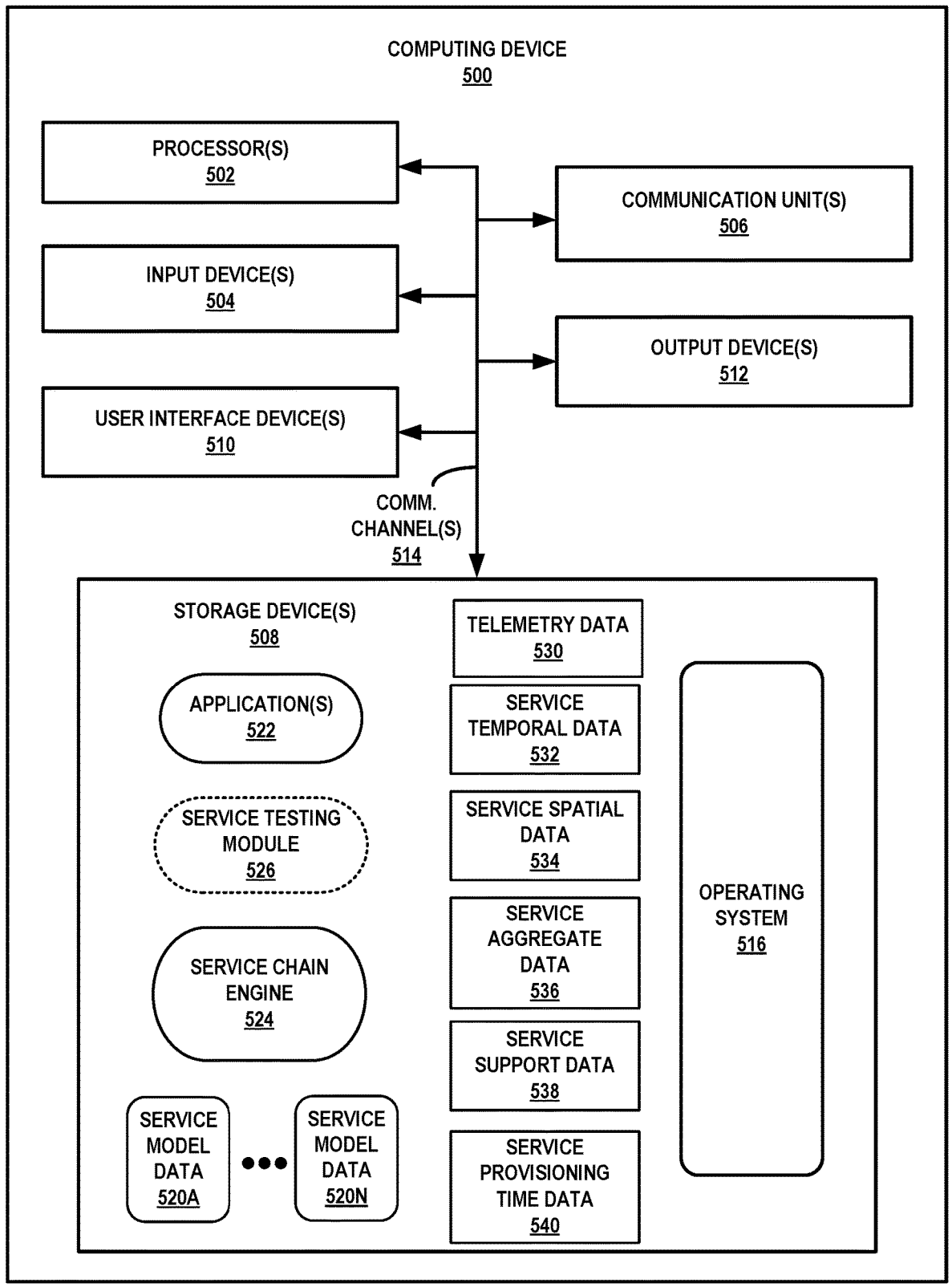
FIG. 6 is a block diagram illustrating further details of one example of a computing device that operates in accordance with one or more techniques of the present disclosure.

FIG. 6 is a block diagram illustrating further details of one example of a computing device that operates in accordance with one or more techniques of the present disclosure. FIG. 6 may illustrate a particular example of a server or other computing device 500 that includes one or more processor(s) 502 for executing controller 50, or any other computing device described herein. Other examples of computing device 500 may be used in other instances. Although shown in FIG. 6 as a stand-alone computing device 500 for purposes of example, a computing device may be any component or system that includes one or more processors or other suitable computing environment for executing software instructions and, for example, need not necessarily include one or more elements shown in FIG. 6 (e.g., communication units 506; and in some examples components such as storage device(s) 508 may not be co-located or in the same chassis as other components).

As shown in the example of FIG. 6, computing device 500 includes one or more processors 502, one or more input devices 504, one or more communication units 506, one or more output devices 512, one or more storage devices 508, and user interface (UI) device(s) 510. Computing device 500, in one example, further includes one or more application(s) 522, service chain engine 524, and operating system 516 that are executable by computing device 500. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 508, 510, and 512 may be coupled by one or more communication channels 514.

Processors 502, in one example, are configured to implement functionality and/or process instructions for execution within computing device 500. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off. Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include 3G and WiFi radios. In some examples, computing device 500 uses communication unit 506 to communicate with an external device.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen. In some examples, a user such as an employee of the co-location facility provider may enter configuration data defining metrics for characterizing services. Service chain engine 524 may store the configuration data to storage devices 508, and in some examples uses the configuration data for building service model data 520.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522 and service chain engine 524 with processors 502, communication unit 506, storage device 508, input device 504, user interface devices 510, and output device 512.

Applications 522 and service chain engine 524 may also include program instructions and/or data that are executable by computing device 500. Service chain engine 524 may include instructions for causing computing device 500 to perform one or more of the operations and actions described in the present disclosure with respect to service chain engine 614.

Service chain engine 524 may include services testing module 526, illustrated with dashed lines to indicate that this may or may not be executable by any given example of computing device 500. For example, in some cases services testing module 526 may independently invoke an interface to the programmable network platform for sending test traffic from the network infrastructure of the co-location facility provider. In some examples, service chain engine 524 uses service testing module 526 to send test traffic from the co-location facility provider's equipment to one or more service providers to obtain information regarding performance of services provided by the service providers. In this way, service chain engine 524 may emulate a customer receiving services from the service provider, to collect data on metrics regarding actual performance of the services (e.g., file transfer, data storage, compute, and other services). In other cases, service chain engine 524 may rely solely on data already being collected for other purposes, and may not independently invoke an interface to the programmable network platform for sending test traffic from the network infrastructure of the co-location facility provider.

In the example of FIG. 6, storage devices 508 store telemetry data 530, service temporal data 532, service spatial data 534, service aggregate data 536, service support data 538, service provisioning time data 540, and service model data 520A-520N. In some examples, storage devices 508 may also store service provider data (not shown). These may correspond to service provider data 601, telemetry data 602, service temporal data 604, service spatial data 605, service aggregate data 606, service support data 608, service provisioning time data 609, and service model data 620A-620N. In some examples, each of service provider data 601, telemetry data 602, service temporal data 604, service spatial data 605, service aggregate data 606, service support data 608, service provisioning time data 609, and service model data 620A-620N of FIGS. 4 and 5.

Figure 7:
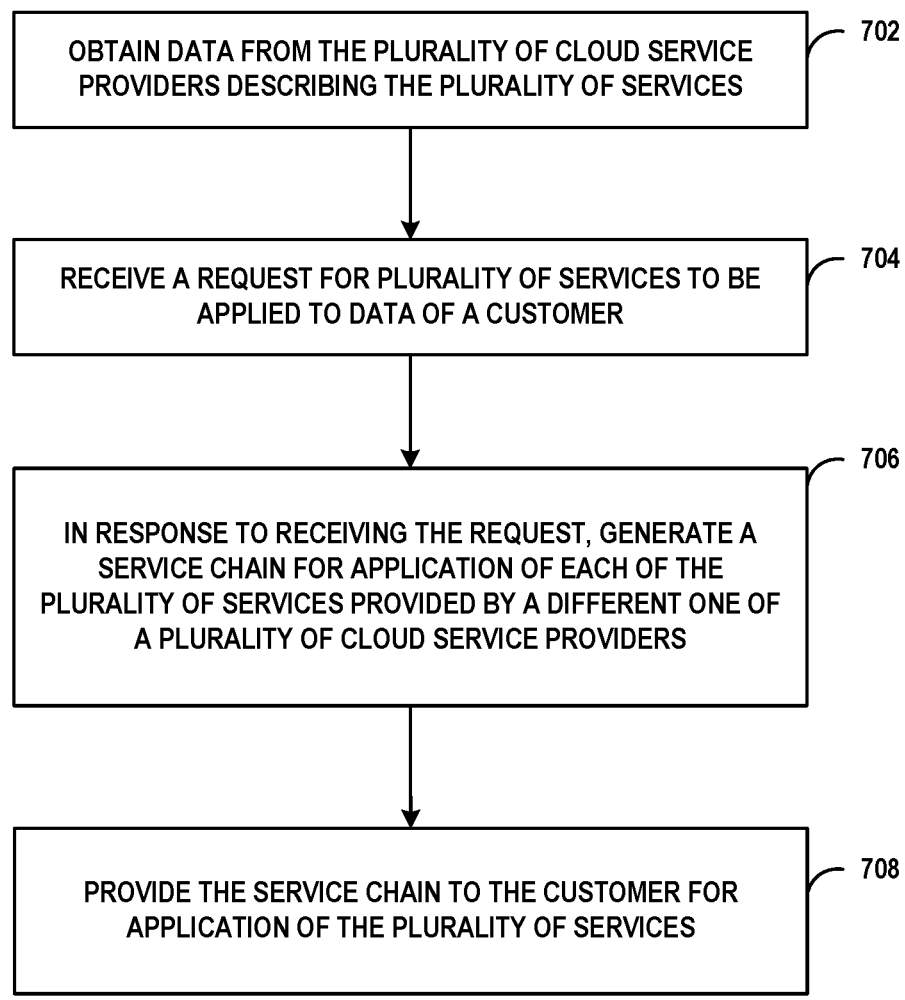
FIG. 7 is a flow diagram illustrating example operations of a computing device that generates and applies a service overlay model, in accordance with techniques of the disclosure.

FIG. 7 is a flow diagram illustrating example operations of a computing device that generates an inter-metro service chain, in accordance with techniques of the disclosure. FIG. 7 is described for purposes of example with respect to controller 50 of FIGS. 1-6.

Controller 50 may obtain data from the plurality of cloud service providers describing the plurality of services (702). For example, controller 50 may obtain telemetry data including analytics information from infrastructure data collectors based on raw metrics data for resources used in a particular service, and/or service data including service temporal data, service spatial data, service aggregate data, service support data, and service provisioning time data, for example. Although shown in FIG. 7 in which controller 50 obtains data prior to receiving a request for a plurality of services, controller 50 may obtain data concurrently or following the receipt of a request for a plurality of services.

Controller 50 may receive a request for a plurality of services to be applied to a customer's data (704). For example, the plurality of services may be provided by a plurality of cloud service providers located among a plurality of geographically distributed metropolitan areas of the co-location facilities provider. The co-location facilities provider may provide a cloud exchange for establishing interconnections between the plurality of cloud service providers located among the plurality of geographically distributed metropolitan areas. Utilizing the established interconnections, controller 50 may provide customers access to cloud service providers of different metropolitan areas. Controller 50 may receive, e.g., a service template, from a customer specifying the requested services for application to the customer's data. In some examples, the customer may include in the request the desired order of services.

In response to receiving the request, controller 50 may generate a service chain for application of each of the plurality of services provided by a different one of a plurality of cloud service providers (706). Based on the data obtained from the plurality of cloud service providers, controller 50 may determine which of the plurality of cloud service providers best satisfy the customer request. For example, for each of the services specified in the request, controller 50 may rank the cloud service providers and co-location facilities based on a score, such as in descending order of highest score to lowest score, and select those having the highest score for each of the services. In this way, controller 50 may determine which cloud service providers at which co-location facilities, and at which metropolitan area would provide the services in a manner best suited to the customer's requests.

Controller 50 may generate a service chain for application of each of the plurality of services determined to best satisfy the customer's request. For example, the co-location facilities provider may establish an end-to-end connection between co-location facilities of different metropolitan areas. Controller 50 may generate a label stack for the inter-metro service chain such that traffic may traverse along the established end-to-end connection to provide the customer access to a plurality of cloud service providers of different metros. That is, controller 50 may generate a label stack that maps the request for the plurality of services to the plurality of cloud service providers determined by controller 50 that best satisfy the customer request.

Controller 50 may provide the service chain to the customer (708). For example, controller 50 may display the service chain on a UI for which a customer may interact with the user interface to view suggested or established service chain offerings in further detail. In some examples, controller may configure network components (e.g., a cloud exchange point) of the co-location facilities for each of the services along the service chain. In some examples, the controller configures the network components after receiving confirmation from the customer to proceed.

Figure 8:
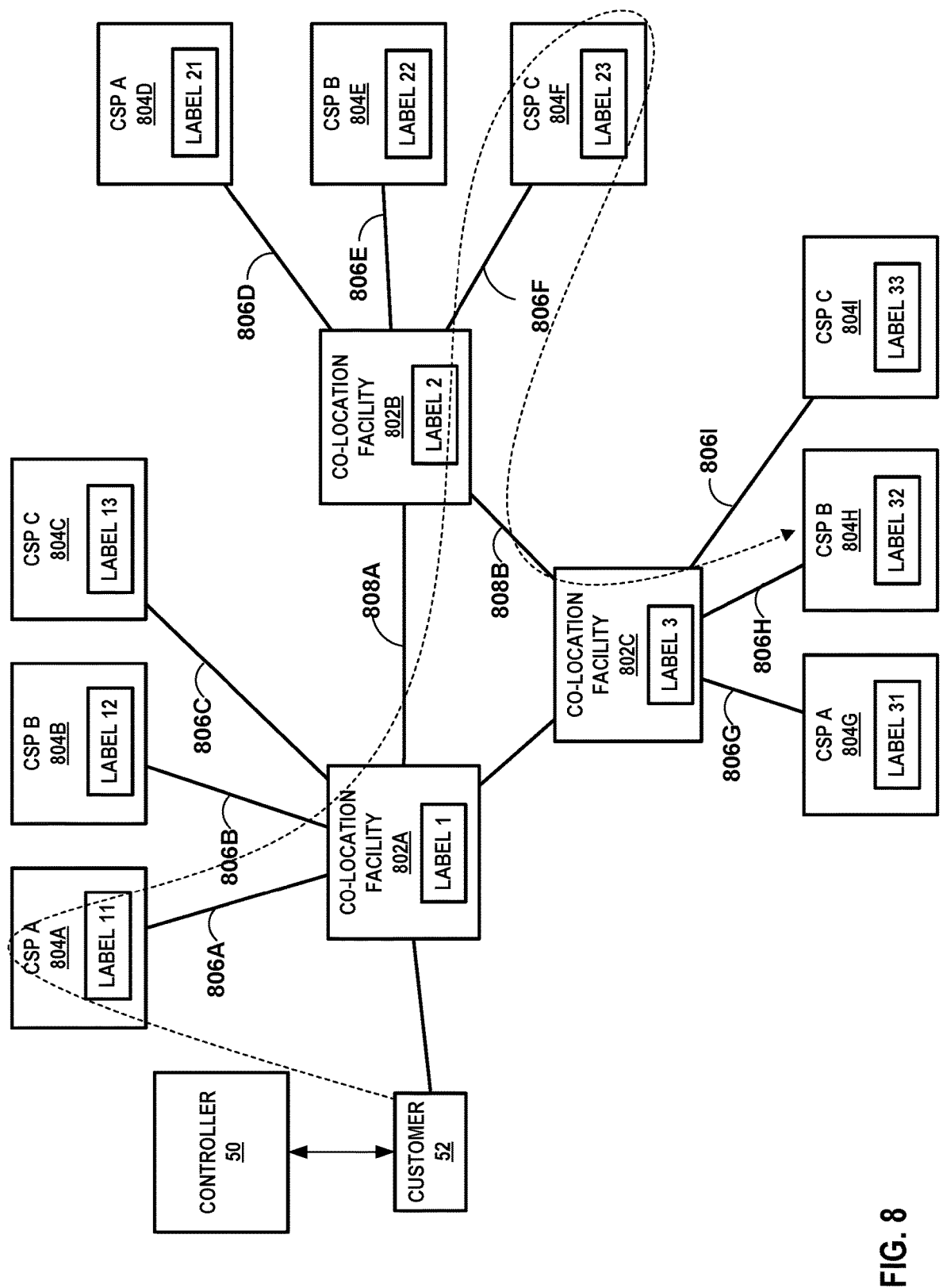
FIG. 8 is a block diagram illustrating an inter-metro service chain, in accordance with the techniques described in this disclosure.

FIG. 8 is a block diagram illustrating an inter-metro service chain, in accordance with the techniques described in this disclosure. Customer 52 may send a request for a plurality of services to controller 50. For example, customer 52 may request firewall services, followed by storage services, and then NAT services. Controller 50 may determine, based on the aggregate view of services, that firewall services offered by CSP 802A, storage services offered by CSP 804F, and NAT services offered by CSP 804H are the best choices for the requested services.

To generate a service chain to include these services offered by CSPs of geographically distributed metros, controller 50 may map the service requests into a label stack and append the label stack to customer data packets as a source route. For example, controller 50 may allocate unique labels to identify CSPs 804A-804I (collectively, "CSPs 804"), co-location facilities 802A-802C (collectively, "co-location facilities 802"), connections 806A-806I (collectively, "connections 806") between CSPs 804 and the corresponding co-location facilities 802, and interconnections 808A-808B (collectively, "inter-metro interconnections 808") between co-location facilities 802. Each network component in the network may implement segment routing techniques for IGP protocols (e.g., IS-IS and OSPF). The service chain may rely on modifying the path of traffic flow with a correct set of service nodes and in a particular order. As one example, providers may use segment routing to steer traffic around service nodes. Service chaining helps providers organize networks around services. Controller 50 may have full visibility of all the customer nodes in all metro locations, all the CSP nodes distributed across all datacenters, all the cloud exchange nodes, all the links connecting the customers to Cloud Exchange nodes as well as CSPs links connected to cloud exchange nodes, and/or all the NSP links interconnecting two or more metros. Each of these nodes/links may generate globally unique labels (e.g., MPLS labels). Services may be associated with CSP nodes. Controller 50 may map service requests of customers into a stack of labels uniquely identifying plurality of service nodes that are visited along the way by customer traffic and advise the customer traffic source node to append the stack of labels as an additional header. Each data packet from the customer will carry the stack of labels that steers the traffic from nodes to nodes and by links to links until the packet reaches the end destination. At each service node along the path toward the destination node, the labels are popped. In some examples, when a packet traverses a transit node for which labels have not been programmed in its label stack, the stack remains intact and the packet is forwarded to the next-hop.

In the example of FIG. 8, co-location facility 802A is allocated a label of 1, co-location facility 802B is allocated a label of 2, and co-location facility 802C is allocated a label of 3. CSP 804A is allocated a label of 11, CSP 804B is allocated a label of 12, CSP 804C is allocated a label of 13, CSP 804D is allocated a label of 21, CSP 804E is allocated a label of 22, CSP 804F is allocated a label of 23, CSP 804G is allocated a label of 31, CSP 804H is allocated a label of 32, and CSP 804I is allocated a label of 33. Connection 806A is allocated a label of 111, connection 806B is allocated a label of 112, connection 806C is allocated a label of 113, connection 806D is allocated a label of 211, connection 806E is allocated a label of 212, connection 806F is allocated a label of 213, connection 806G is allocated a label of 311, connection 806H is allocated a label of 312, and connection 806I is allocated a label of 313. Inter-metro interconnection 808A is allocated a label of 11221, and inter-metro interconnection 808B is allocated a label of 11222.

As one example, customer 52 may request the following services for the data packets from co-location facility provider hosting cloud exchange services in multiple metro locations: first a firewall service, followed by a storage service, and followed by a NAT service in the end. Customer 52 may desire having all these services with some constraints such as minimal latency for firewall services but low cost for storage and NAT services. For the storage and NAT services, latency may not be a factor for the customer. In response, controller 50 may map the service requests as follows: CSP node 804A, followed by CSP node 804F, and followed by CSP node 804H. Controller 50 may, e.g., generate an MPLS label stack identifying the service chain of firewall services offered by CSP 804A, storage services offered by 804F, and NAT services offered by 804H. To implement the service chain, controller 50 may generate the following label stack:

| |
|---|
| 1 |
| 111 |
| 11 |
| 11221 |
| 2 |
| 213 |
| 23 |
| 11222 |
| 3 |
| 313 |
| 32 |

Each customer that originated the data packet (Node 52A) with the above label stack may originally attempt to reach label node 1, which identifies co-location facility 802A. There may be one or more links that reach Node 802A from Node 52A. The label stack indicates we ignore Node 802A. When node 802A receives the packet, node 802A pops the label 1 and examines the next label, which is 111. Label 111 identifies connection 806A, which is an adjacency link pointing to CSP node 804A (Label 11) where the first service (Firewall service) is located. Packets traverse towards 804A such that the customer may receive the Firewall service. Node 804A may then pop label 111 and label 11 from the packet header. The next label on top of label stack is 11221 that steers packet flow towards the Inter-metro interconnection link 808A, such that the packet travels towards co-location facility 802B in a different metro to receive the next requested service in the service intent, e.g., the storage services.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

What is claimed is:

1. A method comprising:
    receiving, by a computing device, a request for a plurality of services to be applied to data of a customer;
    in response to receiving the request, generating, by the computing device, a service chain for application of each of the plurality of services provided by a different one of a plurality of cloud service providers, wherein the services are applied by each of the plurality of cloud service providers at co-location facilities in a plurality of geographically distributed metropolitan areas; and providing, by the computing device and to the customer, the service chain for application of the plurality of services.

2. The method of claim 1, wherein the co-location facilities include one or more interconnections between the plurality of cloud service providers.

3. The method of claim 2, wherein the one or more interconnections comprises one or more fiber optic connections.

4. The method of claim 1, wherein generating the service chain comprises:

generating the service chain having at least a first service of the plurality of services provided by a first cloud service provider located in a first metropolitan area and a second service of the plurality of services provided by a second cloud service provider located in a second metropolitan area.

5. The method of claim 1, further comprising:

obtaining, by the computing device, data from the plurality of cloud service providers describing the plurality of services; and determining, based on the data obtained from the plurality of cloud service providers, the plurality of cloud service providers that best satisfy the request for the plurality of services for generation of the service chain.

6. The method of claim 1, wherein receiving the request for the plurality of services comprises:

receiving a service template indicating the plurality of services requested by the customer.

7. The method of claim 6, wherein the service template further indicates a preferred order of the plurality of services.

8. The method of claim 1, wherein generating the service chain comprises:

generating a label stack that maps the request for the plurality of services to the plurality of cloud service providers; and appending the label stack to a data packet from the customer.

9. The method of claim 8, wherein generating the label stack comprises:

allocating a plurality of unique labels identifying the plurality of cloud service providers;

allocating a plurality of unique labels identifying the co-location facilities;

allocating a plurality of unique labels identifying a plurality of connections between the co-location facilities and the plurality of cloud service providers; and allocating one or more unique labels identifying one or more interconnections coupling the co-location facilities.

10. The method of claim 1, wherein providing the service chain comprises programming a cloud exchange point at one or more of the co-location facilities to apply the service chain.

11. A computing device comprising:

at least one computer processor; and a memory comprising instructions that when executed by the at least one computer processor cause the at least one computer processor to:

receive a request for a plurality of services to be applied to data of a customer;

in response to receiving the request, generate a service chain for application of each of the plurality of services provided by a different one of a plurality of cloud service providers, wherein the services are applied by each of the plurality of cloud service providers at co-location facilities in a plurality of geographically distributed metropolitan areas; and provide the service chain to the customer for application of the plurality of services.

12. The computing device of claim 11, wherein the co-location facilities include one or more interconnections between the plurality of cloud service providers.

13. The computing device of claim 12, wherein the one or more interconnections comprises one or more fiber optic connections.

14. The computing device of claim 11, wherein, to generate the service chain, the memory further comprising instructions that when executed by the at least one computer processors cause the at least one computer processors to:

generate the service chain having at least a first service of the plurality of services provided by a first cloud service provider located in a first metropolitan area and a second service of the plurality of services provided by a second cloud service provider located in a second metropolitan area.

15. The computing device of claim 11, the memory further comprising instructions that when executed by the at least one computer processor cause the at least one computer processor to:

obtain data from the plurality of cloud service providers describing the plurality of services; and determine, based on the data obtained from the plurality of cloud service providers, the plurality of cloud service providers that best satisfy the request for the plurality of services for generation of the service chain.

16. The computing device of claim 11, wherein the request comprises a service template indicating the plurality of services requested by the customer.

17. The computing device of claim 16, wherein the service template further indicates a preferred order of the plurality of services.

18. The computing device of claim 11, the memory further comprising instructions that when executed by the at least one computer processor cause the at least one computer processor to:

generate a label stack that maps the request for the plurality of services to the plurality of cloud service providers; and append the label stack to a data packet from the customer.

19. The computing device of claim 18, the memory further comprising instructions that when executed by the at least one computer processor cause the at least one computer processor to:

allocate a plurality of unique labels identifying the plurality of cloud service providers;

allocate a plurality of unique labels identifying the co-location facilities;

allocate a plurality of unique labels identifying a plurality of connections between the co-location facilities and the plurality of cloud service providers; and allocate one or more unique labels identifying one or more interconnections coupling the co-location facilities.

20. The computing device of claim 11, wherein, to provide the service chain, the memory further comprising instructions that when executed by the at least one computer processors cause the at least one computer processors to:

program a cloud exchange point at one or more of the co-location facilities to apply the service chain.

21. A non-transitory computer-readable storage medium encoded with instructions that, when executed, cause at least one processor of a computing device of a co-location facility provider to:
- receive a request for a plurality of services to be applied to data of a customer;
- in response to receiving the request, generate a service chain for application of each of the plurality of services provided by a different one of a plurality of cloud service providers at co-location facilities in a plurality of geographically distributed metropolitan areas; and
- provide the service chain to the customer for application of the plurality of services.

\* \* \* \* \*